(12) United States Patent
Kitaura et al.

(10) Patent No.: US 11,099,034 B2
(45) Date of Patent: Aug. 24, 2021

(54) POSITION SENSOR

(71) Applicant: DENSO CORPORATION, Kariya (JP)

(72) Inventors: Yasuhiro Kitaura, Kariya (JP); Atsushi Kobayashi, Kariya (JP); Michihiro Makita, Kariya (JP); Akito Sasaki, Kariya (JP); Tetsuya Ohmi, Kariya (JP)

(73) Assignee: DENSO CORPORATION, Kariya (JP)

( * ) Notice: Subject to any disclaimer, the term of this patent is extended or adjusted under 35 U.S.C. 154(b) by 105 days.

(21) Appl. No.: 16/697,806

(22) Filed: Nov. 27, 2019

(65) Prior Publication Data

US 2020/0096367 A1    Mar. 26, 2020

Related U.S. Application Data

(63) Continuation of application No. PCT/JP2018/019061, filed on May 17, 2018.

(30) Foreign Application Priority Data

Jun. 16, 2017 (JP) .............................. JP2017-118777

(51) Int. Cl.
*G01D 5/14* (2006.01)
*G01D 5/245* (2006.01)

(52) U.S. Cl.
CPC ............. *G01D 5/145* (2013.01); *G01D 5/245* (2013.01)

(58) Field of Classification Search
CPC ................................ G01D 5/145; G01D 5/245
See application file for complete search history.

(56) References Cited

U.S. PATENT DOCUMENTS 5,596,272 A * 1/1997 Busch .................... G01D 5/147
324/174
6,992,480 B2 * 1/2006 Schroeder .......... G01D 5/24404
324/207.22

(Continued)

FOREIGN PATENT DOCUMENTS

JP    H09-145305 A    6/1997
JP    H11-192853 A    7/1999

(Continued)

OTHER PUBLICATIONS

U.S. Appl. No. 16/676,645, filed Nov. 7, 2019, Kobayashi et al.
U.S. Appl. No. 16/677,975, filed Nov. 8, 2019, Sasaki et al.
U.S. Appl. No. 16/697,902, filed Nov. 27, 2019, Kobayashi et al.

*Primary Examiner* — Reena Aurora
(74) *Attorney, Agent, or Firm* — Posz Law Group, PLC

(57) ABSTRACT

A position sensor includes a detector and a signal processor. The detector includes a magnet generating a bias magnetic field and a detection element configured to be applied by the bias magnetic field, and generates plural detection signals including distinct phase difference and corresponding to plural ranges aligned in one direction along a movement direction of a detection target, based on a change in a magnetic field received by the detection element from the detection target with a movement of the detection target having a magnetic body. The signal processor acquires the detection signals from the detector, compares the detection signals with a threshold value, and specifies a position of the detection target as a position at one of the ranges based on a combination of magnitude relation between the detection signals and the threshold value.

12 Claims, 22 Drawing Sheets

(56) References Cited

U.S. PATENT DOCUMENTS

| | | | |
|---|---|---|---|
| 2006/0164075 A1 | | 7/2006 | Niwa |
| 2008/0042644 A1 | | 2/2008 | Heo et al. |
| 2018/0335441 A1 | * | 11/2018 | Hammerschmidt ...... G01P 3/44 |
| 2019/0265074 A1 | * | 8/2019 | Gaydov ................. G01D 5/245 |

FOREIGN PATENT DOCUMENTS

| | | |
|---|---|---|
| JP | 2010-160104 A | 7/2010 |
| JP | 2012-042405 A | 3/2012 |
| JP | 2015-178870 A | 10/2015 |
| WO | 2018/230087 A1 | 12/2018 |
| WO | 2018/230242 A1 | 12/2018 |
| WO | 2018/230243 A1 | 12/2018 |

* cited by examiner

POSITION SENSOR

CROSS REFERENCE TO RELATED APPLICATION

The present application is a continuation application of International Patent Application No. PCT/JP2018/019061 filed on May 17, 2018, which designated the U.S. and claims the benefit of priority from Japanese Patent Application No. 2017-118777 filed on Jun. 16, 2017. The entire disclosures of all of the above applications are incorporated herein by reference.

TECHNICAL FIELD

The present disclosure relates to a position sensor.

BACKGROUND

A detector may include a sensor for sensing an approaching detection target. In this detector, the sensor may output a signal with a predetermined level when the detection target is in proximity.

SUMMARY

The present disclosure describes a position sensor that outputs a signal corresponding to a position of a detection target.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
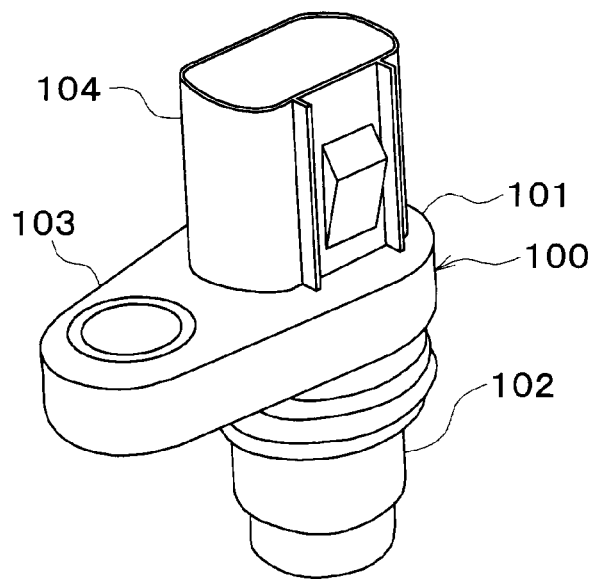
FIG. 1 is an external view of a position sensor according to a first embodiment of the present disclosure.

In a related art, in a case where the amount of movement of a detection target increases, the detection target may deviate from a detectable range of a sensor. In other words, there is a limit in a range where the sensor can detect the detection target.

It may be considered to broaden the detectable range by providing plural sensors. However, it may be necessary to provide a space for the plural sensors. Since the configuration includes the plural sensors, the cost of a detector increases.

In one or more embodiments of the present disclosure, a position sensor is configured to detect a movement of a detection target with one detector, even if the amount of movement of the detection target increases.

A position sensor according to a first aspect of the present disclosure includes a detector having a magnet generating a bias magnetic field and a detection element applied by the bias magnetic field. The detector generates plural detection signals, which respectively correspond to plural ranges aligned in one direction along a movement direction of a detection target, having distinct phase difference based on a change in a magnetic field received by the detection element from the detection target along with a movement of the detection target having a magnetic body The position sensor also includes a signal processor that acquires the detection signals from the detector, compares the detection signals with a threshold value, and specifies a position of the detection target as a position at one of the ranges based on a combination of magnitude relation between the detection signals and the threshold value.

The detection target includes plural region parts, which respectively correspond to the plural ranges. Additionally, the plural region parts are connected in a stepwise manner in the movement direction of the detection target, on a detection surface of the detection target facing the detector.

A position sensor according to a second aspect of the present disclosure is different from the position sensor according to the first aspect of the present disclosure. The position sensor according to the second aspect includes a detector that generates plural detection signals, which respectively correspond to plural ranges aligned in one direction along a movement direction of a detection target having a magnet, based on a change in a magnetic field received by the detection element from the detection target along with a movement of the detection target.

The region part, which indicates a position of the detection target, also exists at a range located at an end of the plural ranges. Therefore, the detector can generate the detection signal based on a change in the magnetic field received from the region part at the end of the detector, when the detector detects the position of the region part at the end of the detector. Since the detection target is configured to be in a detectable range of the detector, it is possible to detect the movement of the detection target with one detector even though the movement amount of the detector increases.

Hereinafter, embodiments of the present disclosure will be described, with reference to the drawings. In the following embodiments, the same reference numeral is given to the same or equivalent parts in the drawings.

First Embodiment

A first embodiment of the present disclosure will be described below with reference to the drawings. A position sensor according to the present embodiment detects a range (state) that covers a position of a detection target and outputs a signal according to the range.

As illustrated in FIG. 1, a position sensor 100 detects the position of a moveable component, as a detection target, in conjunction with an operation of a vehicle shift position. Specifically, the position sensor 100 detects a signal based on the position of the shaft to acquire the state of the shaft.

The state of the shaft means the position of the shaft when the shift position is operated by a user. For example, the shaft is moved in conjunction with a parking position of the shift position. When the shift position is operated to be the parking position, the shaft is axially moved. The shaft thus reflects the state of the parking position. The position sensor 100 detects a position of the shaft corresponding to the parking position.

When the shift position is operated to be a position other than the parking position, the shaft reflects the state of the position other than the parking position. In this case, the position detects the position of the shaft other than the position corresponding to the parking position. The shaft may be moved in conjunction with the position other than the parking position.

The shaft is entirely made of, for example, a magnetic material. In the shaft, a surface opposing the position sensor 100 may be made of a magnetic material and other portions may be made of other metal materials.

The position sensor 100 includes a case 101 formed by molding a resin material such as PPS. The case 101 includes a distal end part 102 on a side of the shaft, a flange 103 fixed to a peripheral mechanism, and a connector 104 to which a harness is connected. A sensing part is disposed within the distal end part 102.

The position sensor 100 is fixed via the flange 103 to the peripheral mechanism so that the distal end part 102 has a predetermined gap to a detection surface of the shaft. Consequently, the shaft moves with respect to the position sensor 100.

Although not illustrated, the position sensor 100 may be fixed to the peripheral mechanism so as to detect the position of a valve operating in conjunction with the shaft. The movement direction of the shaft is not limited to a straight direction and a reciprocal direction. The shaft 200 may rotate or reciprocate at a specific angle. As described above, the position sensor 100 can be used to detect the state of a movable component moving in conjunction with the operation of the vehicle shift position such as movement and rotation.

Figure 2:
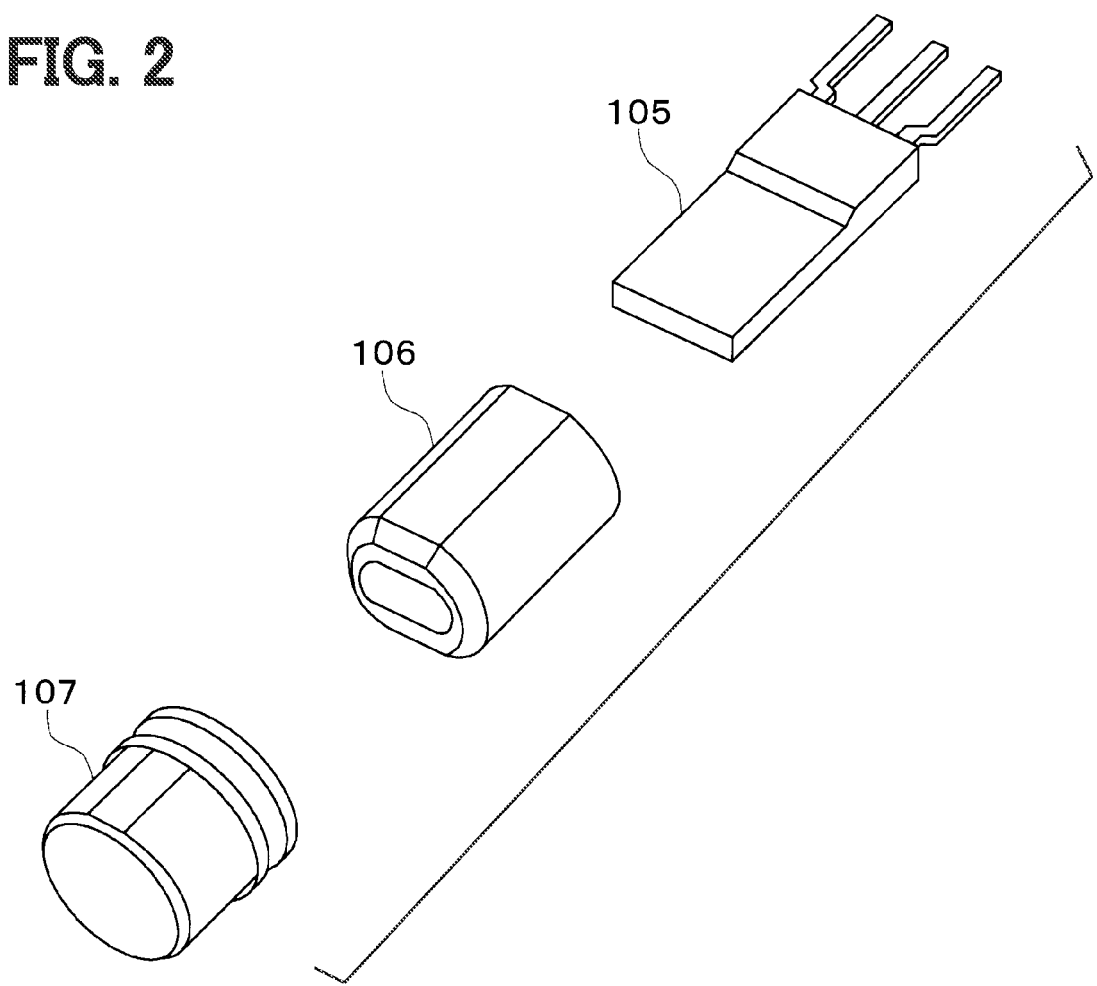
FIG. 2 is an exploded perspective view of components configuring a magnetic detection system using a magnetic resistance element.

The position sensor 100 may employ a magnetic detection system using a magnetic resistance element or a magnetic detection system using a Hall-effect sensor. As illustrated in FIG. 2, in the case of the magnetic detection system using a magnetic resistance element, the position sensor 100 includes a mold IC 105, a magnet 106, and a holder 107. These components are housed in the distal end part 102 of the case 101. The mold IC 105 is inserted into the magnet 106 formed in a hollow cylindrical shape. The magnet 106 generates a bias magnetic field, and is inserted into the holder 107 having a bottomed cylindrical shape.

Figure 3:
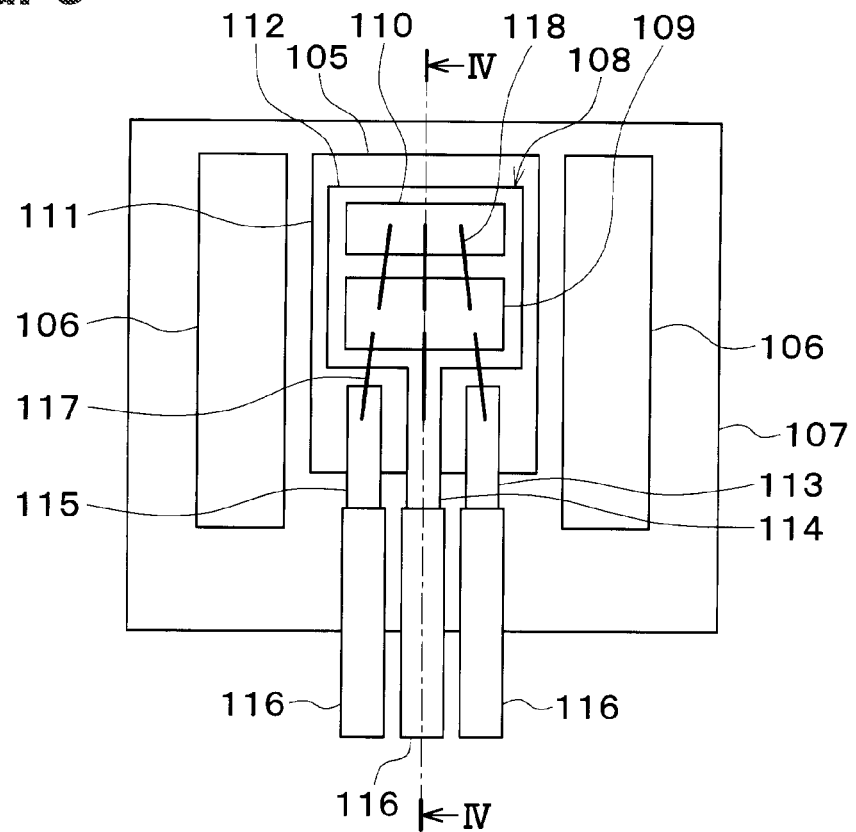
FIG. 3 is a plan view of the respective components illustrated in FIG. 2.
Figure 4:
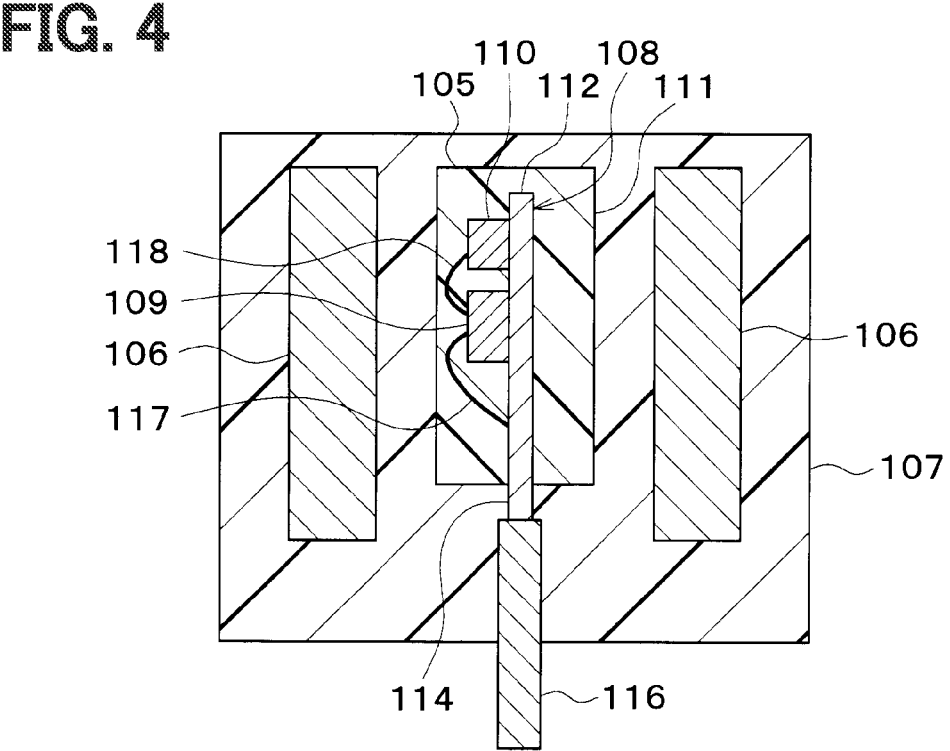
FIG. 4 is a cross-sectional view taken along a line IV-IV of FIG. 3.

As illustrated in a schematic plan view of FIG. 3 and a schematic cross-sectional view of FIG. 4, the mold IC 105, the magnet 106, and the holder 107 are integrated with each other. The main part of the mold IC 105 is disposed in a hollow part of the magnet 106. The holder 107 fixes the positions of the mold IC 105 and the magnet 106.

The mold IC 105 includes a lead frame 108, a processing circuit chip 109, a sensor chip 110, and a mold resin 111. The lead frame 108 includes a plate-like island 112 and plural leads 113 to 115. The island 112 is disposed so that its flat surface is vertical to the movement direction of a detection target.

The leads 113 to 115 include a power supply terminal 113 to which a power supply voltage is applied, a ground terminal 114 to which a ground voltage is applied, and an output terminal 115 for outputting a signal. That is, the leads 113 to 115 are three leads for a power supply, ground, and a signal, respectively. A terminal 116 is connected to a distal end of each of the leads 113 to 115. The terminal 116 is disposed in the connector 104 of the case 101. The terminal 116 is also connected to a harness.

In the present embodiment, the ground lead 114 of the leads 113 to 115 is integrated with the island 112. The island 112 may be completely separated from all the leads 113 to 115.

The processing circuit chip 109 and the sensor chip 110 are mounted on the island 112 by an adhesive or the like. The processing circuit chip 109 includes a circuit unit that processes signals from the sensor chip 110. The sensor chip 110 includes a magnetic resistance element whose resistance value changes when being externally affected by a magnetic field. The magnetic resistance element is, for example, AMR, GMR, or TMR. The leads 113 to 115 are electrically connected via wires 117 to the processing circuit chip 109. The processing circuit chip 109 is electrically connected via wires 118 to the sensor chip 110.

The mold resin 111 seals the island 112, parts of the leads 113 to 115, the processing circuit chip 109, and the sensor chip 110. The mold resin 111 is molded in a shape fixed in the hollow part of the magnet 106.

Figure 5:
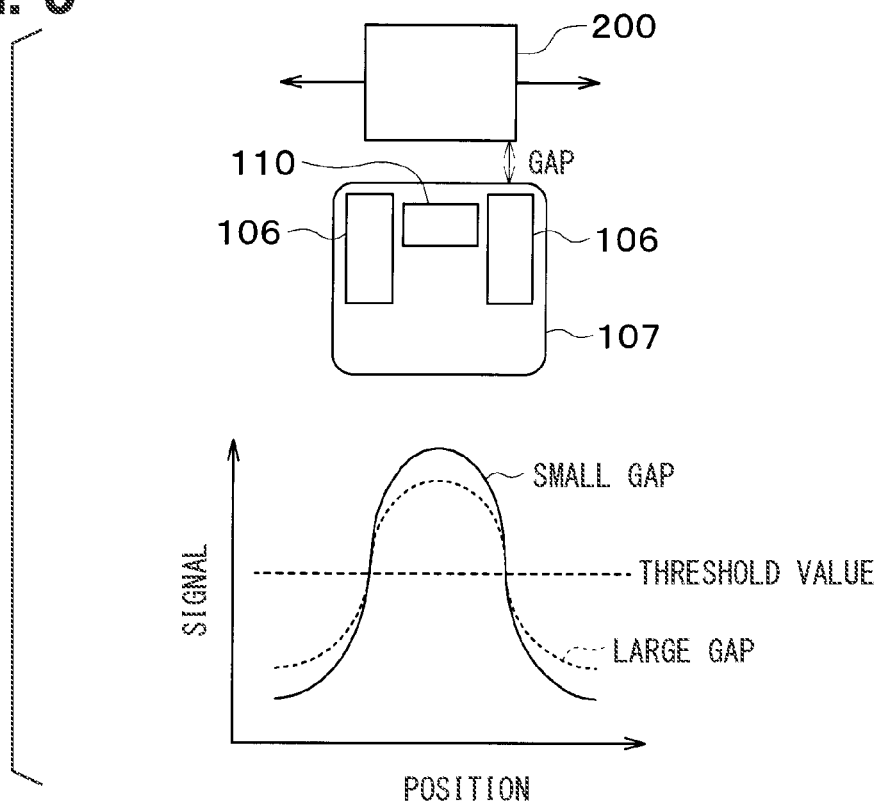
FIG. 5 illustrates the detection signal from the magnetic resistance element.

A detection signal generated by the magnetic detection system using a magnetic resistance element will be described. As illustrated in FIG. 5, the holder 107 is disposed with a predetermined gap to the detection target 200. When the detection target 200 moves relative to the holder 107, a detection signal is maximized at the center of the detection target 200 in the movement direction. When the gap increases, the amplitude of the detection signal decreases. On the other hand, when the gap decreases, the amplitude of the detection signal increases. It is possible to detect the position of the detection target 200 by setting a threshold value of the detection signal.

FIG. 5 illustrates only the relationship between the movement of the detection target 200 and a detection signal from a magnetic detection element. The detection signal is generated by outputs of plural magnetic resistance elements, which will be described later.

Figure 6:
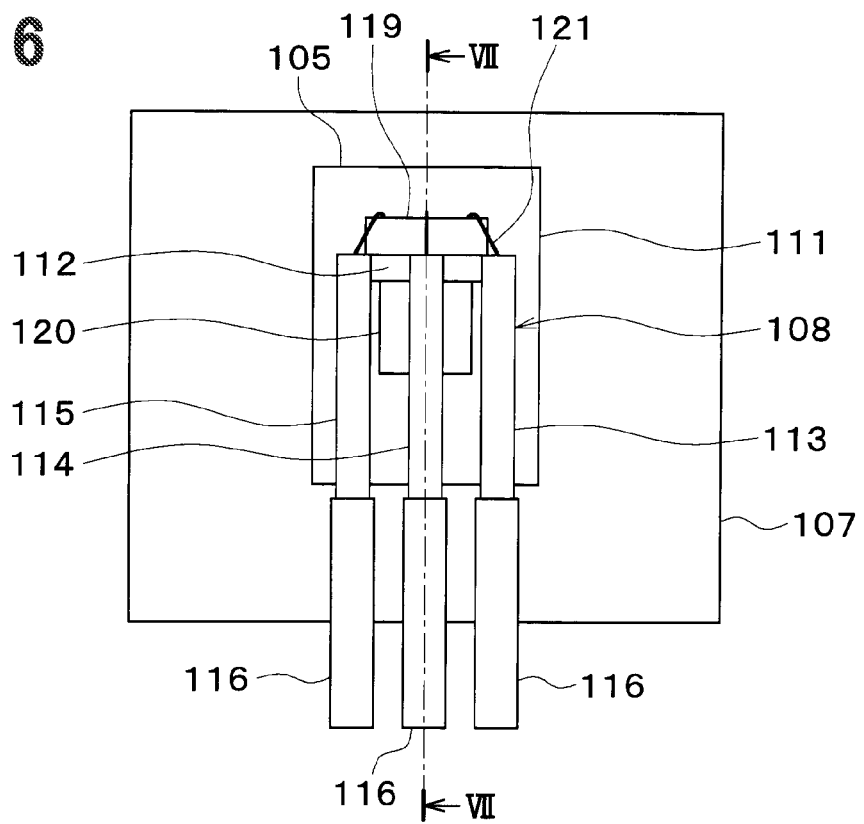
FIG. 6 is a plan view of components included in a magnetic detection system using a Hall-effect sensor.
Figure 7:
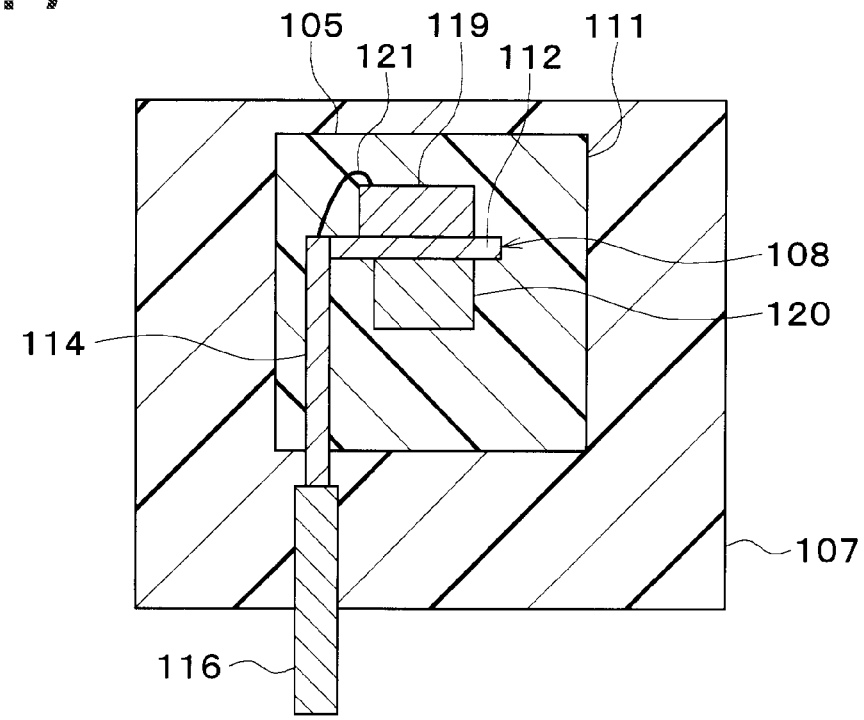
FIG. 7 is a cross-sectional view taken along a line VII-VII of FIG. 6.

When the magnetic detection system using a Hall-effect sensor is used, the mold IC 105 is inserted and fixed into the holder 107 as illustrated in a schematic plan view of FIG. 6 and a schematic cross-sectional view of FIG. 7. The mold IC 105 includes the lead frame 108, an IC chip 119, a magnet 120, and the mold resin 111.

The island 112 of the lead frame 108 is disposed so that its flat surface is parallel to the movement direction of a detection target 200. The leads 113 to 115 each are disposed to be vertical to the movement direction of the detection target 200. The ground lead 114 is integrated with the island 112 so as to form a right angle with the island 112. A terminal 116 is connected to a distal end of each of the leads 113 to 115.

The IC chip 119 includes plural Hall-effect sensors and a signal processing circuit. That is, the magnetic detection system using the Hall-effect sensors employs a one chip configuration. The magnet 120 is fixed on a surface of the island 112 opposite to a surface on which the IC chip 119 is disposed. The leads 113 to 115 each are electrically connected via wires 121 to the IC chip 119. The mold resin 111 is molded in a shape fixed in the hollow part of the holder 107.

Figure 8:
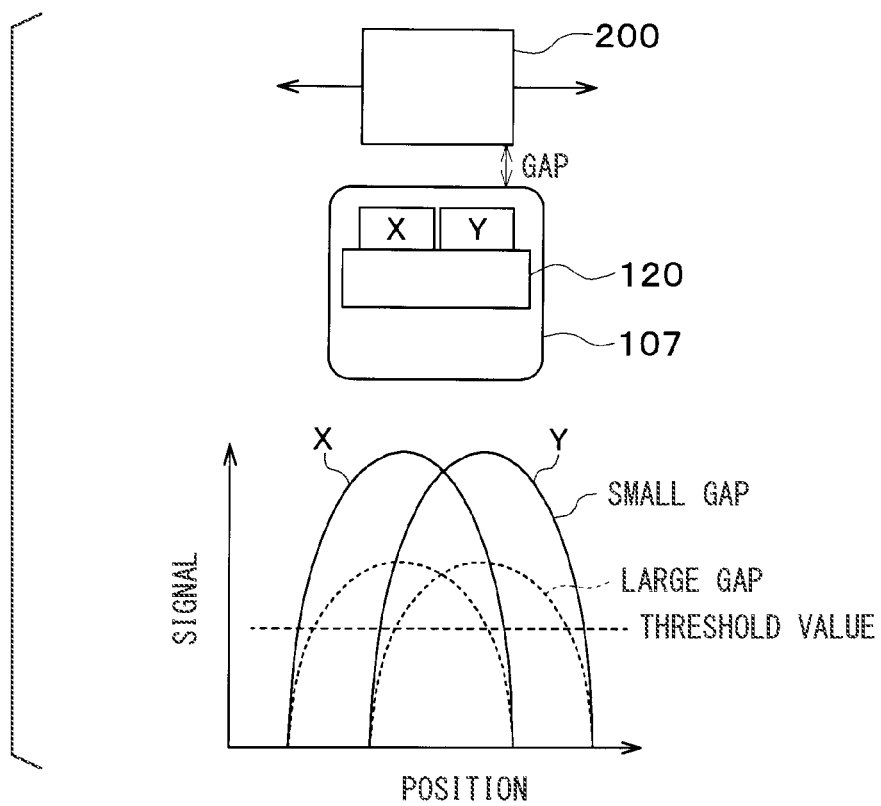
FIG. 8 illustrates a detection signal from the Hall-effect sensor.

A detection signal generated by the magnetic detection system using the Hall-effect sensors is described. As illustrated in FIG. 8, in a case where two Hall-effect sensors (X, Y) are disposed on the magnet 120, for example, when the detection target 200 moves relative to the holder 107, each detection signal is maximized according to the position of each Hall-effect sensor (X, Y). The relationship between a gap and the amplitude of a detection signal is similar to that of the magnetic detection system using a magnetic resistance element. It is possible to detect the position of the detection target 200 by setting a threshold value of each detection signal.

The present embodiment employs the magnetic detection system using a magnetic resistance element. The magnetic resistance element for detecting a magnetic vector has a merit of being capable of cancelling a precision error due to a variation in gap. In addition, the magnetic resistance element also has a merit of being capable of reducing or cancelling the effect of stress generated in the sensor chip 110. Consequently, it is possible to achieve detection with high precision.

Figure 9:
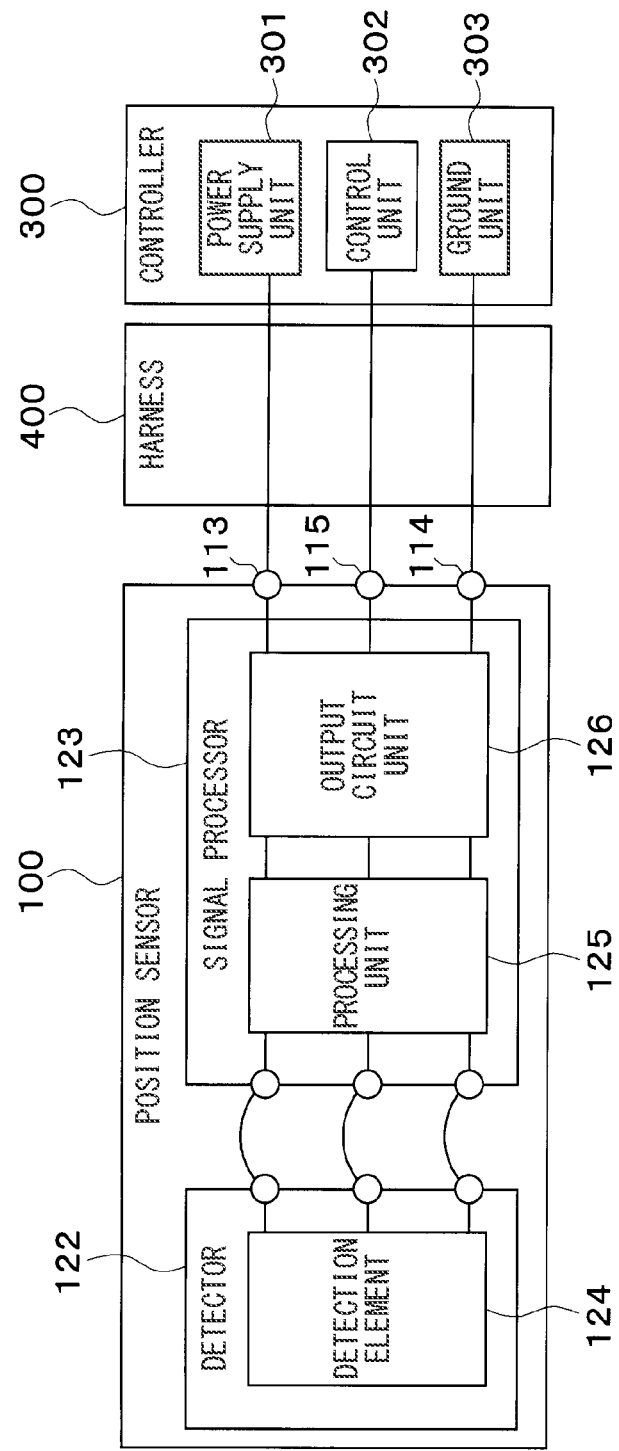
FIG. 9 illustrates a circuit configuration of the position sensor.

The following describes a circuit configuration in the sensor chip 110 and the processing circuit chip 109. As illustrated in FIG. 9, the position sensor 100 is electrically connected via a harness 400 to a controller 300. As the mold IC 105 has three leads 113 to 115 as described above, the harness 400 includes three wires.

The controller 300 is, for example, a transmission control unit (TCU). The controller 300 includes a power supply unit 301, a control unit 302, and a ground unit 303. The power supply unit 301 is a circuit unit that supplies a power supply voltage to the position sensor 100. The control unit 302 is a circuit unit that executes predetermined control according to an output signal input from the position sensor 100. The ground unit 303 is a circuit unit that sets a ground voltage of the position sensor 100. The controller 300 may be configured as an electronic control unit (ECU).

The position sensor 100 includes a detector 122 and a signal processor 123. The detector 122 includes a magnet 106 and a detection element 124 provided at the sensor chip 110. The signal processor 123 is disposed in the processing circuit chip 109. The detection element 124 and the signal processor 123 operate based on a power supply voltage and a ground voltage supplied from the controller 300.

The detector 122 generates plural detection signals corresponding to plural ranges along a moving direction of the detection target 200 and having different phase differences, based on a change in the magnetic field received from the detection target 200. The plural ranges, which are along the movement direction of the detection target 200, are not arranged along the moving direction of the detection target 200 in a parallel manner, but are arranged in one direction along the moving direction of the detection target 200 in a series manner.

Figure 10:
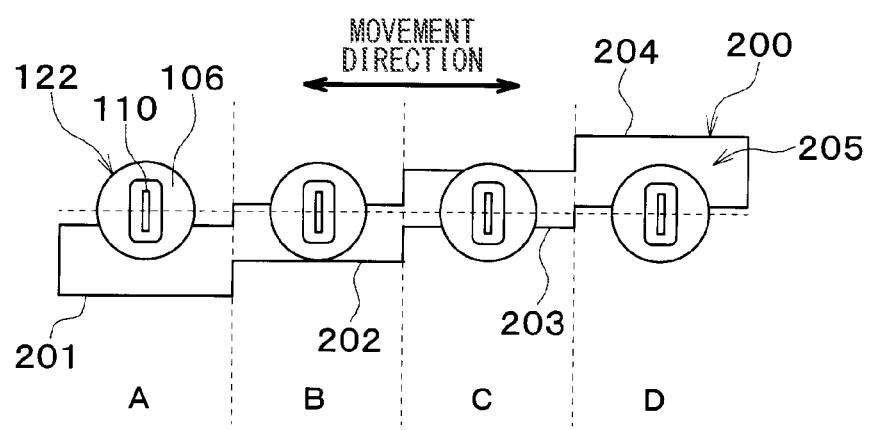
FIG. 10 illustrates a relative positional relationship between each region part of a detection target and a detector.

As shown in FIG. 10, the detection target 200 includes four region parts 201 to 204 respectively corresponding to plural ranges A to D. Each of the region parts 201 to 204 is configured by a rectangular plate member. Each of the region parts 201 to 204 is connected in a stepwise manner in a movement direction of the detection target 200 on a detection surface 205 of the detection target 200 facing the detector 122.

"Connected in a stepwise manner" means that the region part 201 and the region part 202 on the detection surface 205 are connected while being shifted in a direction perpendicular to the movement direction. Similarly, the region part 202 and the region part 203 on the detection surface 205 are connected while being shifted in a direction perpendicular the movement direction. The same applies to the region part 203 and the region part 204. In each of the region parts 201 to 204, the both end portions along the movement direction, that is, the two longer side portions have a step-formed shape. The region part 202, which is adjacent to the region part 201, is connected to the region part 201 in a series manner in one direction. The region part 203 is connected to the region part 202 in a series manner in one direction at a side of the region part 202 opposite to the side of the region part 202 connected by the region part 201. Similarly, the region part 204 is connected to the region part 203 in a series manner in one direction at a side of the region part 203 opposite to the side of the region part 203 connected by the region part 202.

The chip surface of the sensor chip 110 where the detection element 124 is provided is oriented in a direction perpendicular to the movement direction of the detector 122.

When the detection target 200 moves in the movement direction with respect to the detector 122 whose position is fixed, each of the region parts 201 to 204 moves with respect to the detector 122 in a direction perpendicular to the movement direction, as an in-plane direction of the detection surface 205. The positional relation between the detector 122 and each of the region parts 201 to 204 is varied by the movement of the detection target 200. FIG. 10 illustrates a positional relation between the detector 122 and each of the region parts 201 to 204 by providing the detector 122 to each of the region parts 201 to 204.

The detection target 200 is configured by, for example, pressing a plate member made of a magnetic material. The region parts 201 to 204 may have the same or different lengths in the movement direction. The region parts 201 to 204 may have the same or different lengths in a direction perpendicular to the movement direction, as the in-plane direction of the detection surface 205. The detection target 200 is fixed to a component such as a shaft. The region parts 201, 204 respectively at both ends of the detection target 200 may be fixed to the shaft.

The detection element 124 includes three element pairs, that is, a first magnetic resistance element pair, a second magnetic resistance element pair, and a third magnetic resistance element pair whose resistance values change depending on the movement of the detection target 200.

Although not shown, the first magnetic resistance element pair, the second magnetic resistance element pair, and the third magnetic resistance element pair are disposed so that the second magnetic resistance element pair is disposed between the first magnetic resistance element pair and the third magnetic resistance element pair in the movement direction of the detection target 200. The second magnetic resistance element pair is disposed to be sandwiched between the first magnetic resistance element pair and the third magnetic resistance element pair. A bias magnetic field is applied to the second magnetic resistance element pair along the central axis of the magnet 106. A bias magnetic field is applied to the first magnetic resistance element pair and the third magnetic resistance element pair so as to surround ends of the magnet 106.

Each of the magnetic resistance element pairs is configured as a half bridge circuit in which two magnetic resistance elements are serially connected between a power supply and a ground. Each of the magnetic resistance element pairs detects a change in resistance value when the two magnetic resistance elements are affected by a magnetic field according to the movement of the detection target 200. Each of the magnetic resistance element pairs outputs a voltage at the intermediate point of the two magnetic resistance elements as a waveform signal based on the change in resistance value. In the configuration where the magnetic resistance element pairs are driven by a current source, a voltage across both ends of each of the magnetic resistance element pairs is formed as a waveform signal.

The detector 122 also includes first to fourth operational amplifiers (not shown) in addition to the magnetic resistance element pairs. It is assumed that the intermediate potential at the intermediate point of the first magnetic resistance element pair is defined as V1 and the intermediate potential at the intermediate point of the second magnetic resistance element pair is defined as V2. The first operational amplifier is a differential amplifier configured to calculate (V1−V2) and output the result as R1. It is assumed that the intermediate potential at the intermediate point of the third magnetic resistance element pair is defined as V3. The second operational amplifier is a differential amplifier configured to calculate (V2−V3) and output the result as R2.

The third operational amplifier is a differential amplifier configured to receive an input of R1 (=V1−V2) from the first operational amplifier, receive an input of R2 (=V2−V3) from the second operational amplifier, calculate R2−R1, and output the result as S1 (=(V2−V3)−(V1−V2)).

The fourth operational amplifier is a differential amplifier configured to receive an input of the intermediate potential V1 from the intermediate point of the first magnetic resistance element pair, receive an input of the intermediate potential V3 from the intermediate point of the third magnetic resistance element pair, calculate (V1−V3), and output the result as S2. The signal S2 has a waveform with a phase difference from the signal S1.

The detector 122 generates and acquires the signal S1 (=V1−V3) and the signal S2 (=2V2−V1−V3) from the outputs of the magnetic resistance element pairs. The detector 122 outputs the signals S1 and S2 to the signal processor 123, as detection signals.

The signal processor 123 acquires detection signals from the detector 122, and identifies the position of the detection target 200 as the position of any one of the plural ranges of the detection target 200 based on a combination of magnitude relationship between each detection signal and a threshold value. The signal processor 123 outputs the position of the detection target 200 to the controller 300. The signal processor 123 includes a processing unit 125 and an output circuit unit 126.

The processing unit 125 receives an input of a second detection signal from the detector 122, and specifies the position of the detection target 200 based on the detection signal. The processing unit 125 has a common threshold value for each detection signal.

The processing unit 125 compares the signals S1 and S2, which are detection signals, to the threshold value. If the signals S1 and S2 are larger than the threshold value, the processing unit 125 determines such a state as Hi. On the other hand, if the signals S1 and S2 are smaller than the threshold value, the processing unit 125 determines such a state as Lo. The processing unit 125 determines the range of the shaft 200 detected by the detector 122 based on a Hi/Lo combination of the signals S1 and S2.

Figure 11:
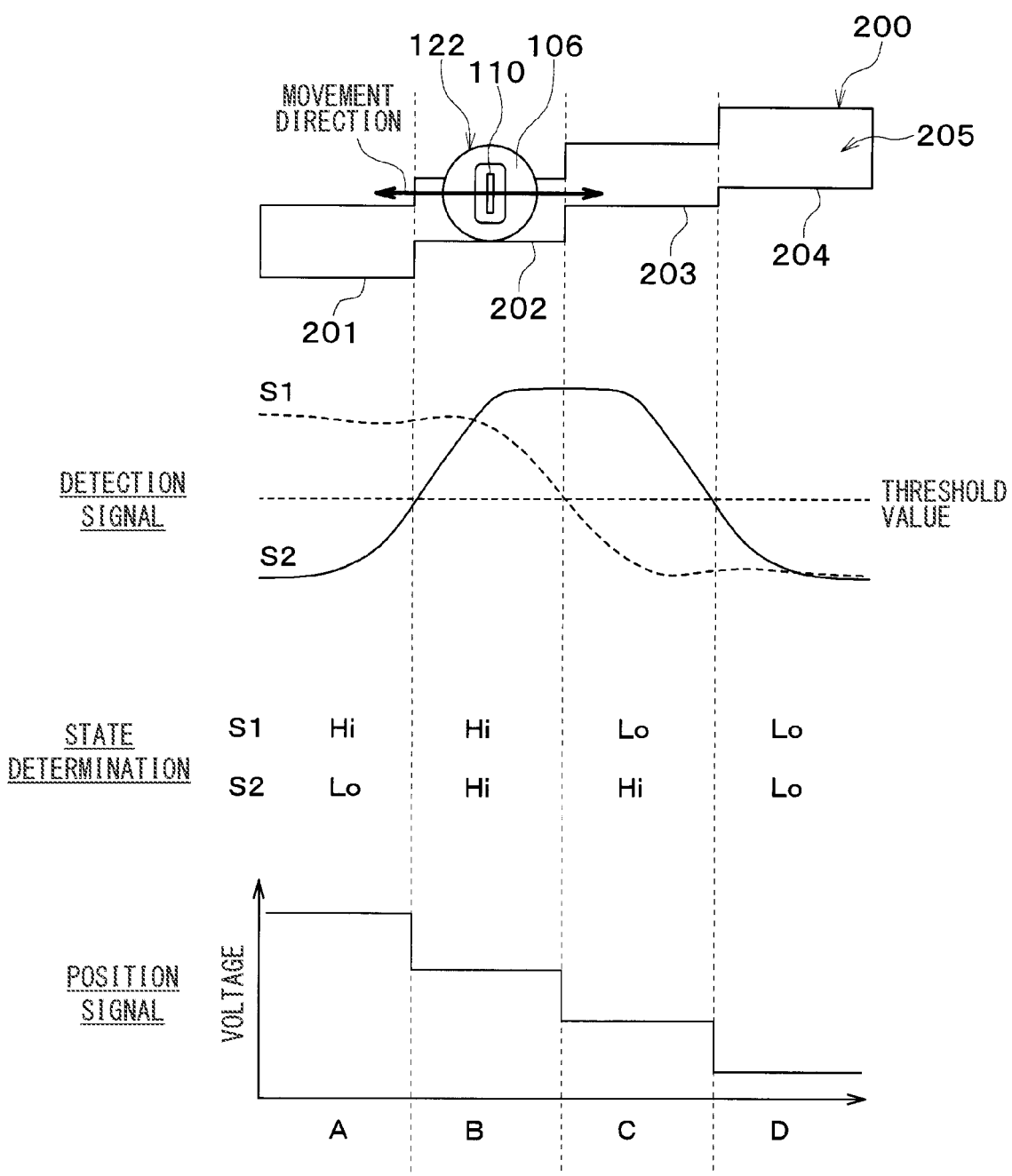
FIG. 11 illustrates a detection signal, a state determination and a position signal for detecting four states.

Specifically, when the signal S1 is Hi and the signal S2 is Lo as illustrated in FIG. 11, the detector 122 detects a range of the region part 201 of the detection target 200. That is, the processing unit 127 specifies the position of the shaft as the detection target 200. The state of the shaft when a position in such a range is specified is referred to as "state A".

Similarly, when the signal S1 is Hi and the signal S2 is Hi, the detector 122 detects a range of the region part 202 of the detection target 200. The state of the shaft 200 when a position in such a range is specified is referred to as "state B".

Similarly, when the signal S1 is Lo and the signal S2 is Hi, the detector 122 detects a range of the region part 203 of the detection target 200. The state of the shaft when a position in such a range is specified is referred to as "state C".

When the signal S1 is Lo and the signal S2 is also Lo, the detector 122 detects a range of the region part 204 of the detection target 200. The state of the shaft when a position in such a range is specified is referred to as "state D". As described above, the processing unit 125 specifies the position of the detection target 200 as a position in one of the ranges in the movement direction of the detection target 200.

The output circuit unit 126 outputs a positional signal, which indicates any one of the states A to D, to the controller 300 based on a determination result of the processing unit 125. The output circuit unit 125 acquires information of the states A to D, which is determined based on the detection signal from the processing unit 125. The output circuit unit 126 outputs a positional signal with a value corresponding to a range that covers a specified position among discrete values set in plural ranges to the controller 300.

In the present embodiment, positional signals with discrete values are voltage signals with different voltage values. The voltage values respectively representing the states A to D are set to discrete values so as not to overlap. For example, the state A is set to $V_H$, the state B is set to $V_{M1}$, the state C is set to $V_{M2}$, and the state D is set to $V_L$. A magnitude relationship of those voltage values is $V_H > V_{M1} > V_{M2} > V_L$. It is only required that the discrete values do not overlap between the states A to D. Consequently, the discrete values may be set as any voltage value in a predetermined voltage range. The predetermined voltage range may be identical between the states A to D such as within 1V. Alternatively, the predetermined voltage range may be different between the states A to D such as the state A is within 1V and the state B is within 2V.

As illustrated in FIG. 11, when the detection target 200 moves in the movement direction, the position signal has a discrete voltage value changing in a stepwise manner. If the voltage value of the position signal increases or decreases momentarily due to a noise, the position signal may reach a voltage value indicating other states. As the control unit 302 of the controller 300 reads a voltage value for a predetermined time, the influence of the noise can be substantially eliminated. That is, the position sensor 100 can output a signal with high noise resistance. The configuration of the position sensor 100 according to the present embodiment has been described above.

The control unit 302 of the controller 300 receives an input of a position signal from the position sensor 100 and use the signal for desired control. Examples of the desired control include control of switching on and off a parking lamp in a meter device of a vehicle, control of permitting or prohibiting other control depending on whether a shift position is a parking position, control of not using the position sensor 100 in case of a fault, and control of switching on a fault lamp.

In some cases, the control unit 302 inputs a signal other than the position signal. This signal is originally impossible as an output of the position sensor 100. In this case, it is assumed that the signal is generated caused by a fault other than a fault of the position sensor 100. For example, the fault is assumed to be a fault of a communication device such as the harness 400. Therefore, the controller 300 can detect a fault of the communication device.

Figure 12:
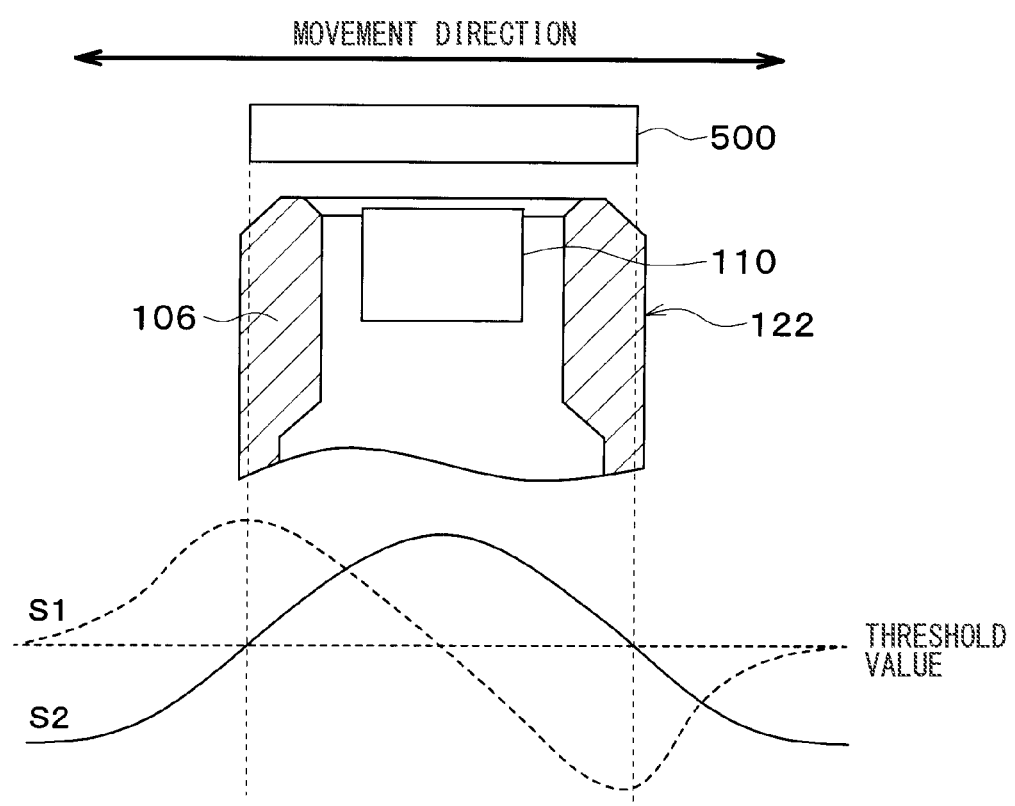
FIG. 12 illustrates a comparative example.

A comparative example describes a case where a block-shaped detection target 500 moves in the movement direction as illustrated in FIG. 12. When the detection target 500 moves away from the detector 122, the magnet 106 of the detector 122 does not have a reaction to the detection target 500. The signal S1 converges to a threshold value. Therefore, it is impossible to determine the movement direction of the detection target 500.

In a case where the detection target 500 has a shape having a length in the movement direction, the detector 122 is difficult to detect the movement direction center of the detection target 500. The detector 122 detects both edges of the detection target 500 in the movement direction to determine the center of the movement direction. Therefore, it is difficult to determine the center of the movement direction, in a situation where the detection target 500 has a longer length and the distance between both edges is far.

In the present embodiment, the region parts 201 to 204, which are the parts to be detected by the detector, are provided within a range of the movement direction of the detection target 200. As shown in FIG. 11, the signals S1, S2 do not converge to the threshold value. The signals are clearly indicated as Hi or Lo with respect to the threshold value. It is also possible to detect the center of the detection target in the movement direction by setting the boundary between the region part 202 and the region part 203 as the center of the detection target 200.

In order not to have the situation of the comparative example illustrated in FIG. 12, the relative relationship between the detection target 200 and the detector 122 is maintained even if the detection target 200 moves. In other words, the region parts 201, 204 for indicating the position of the detection target 200 are also provided at a portion of the detection target 200 located at the both ends of plural ranges. Therefore, it is possible that the detector 122 generates a detection signal based on a change in the magnetic field under an influence from the region parts 201, 204.

As compared with the comparative example, since the detectable range of the detector 122 is substantially wider, it is possible to detect the movement of the detection target 200 with one detector 122, even if the amount of movement of the detection target is large. By segmenting the detection target 200 into a shape divided with a number of positions to be discriminated, it is possible to determine each segment and perform an output corresponding to the segment.

Figure 13:
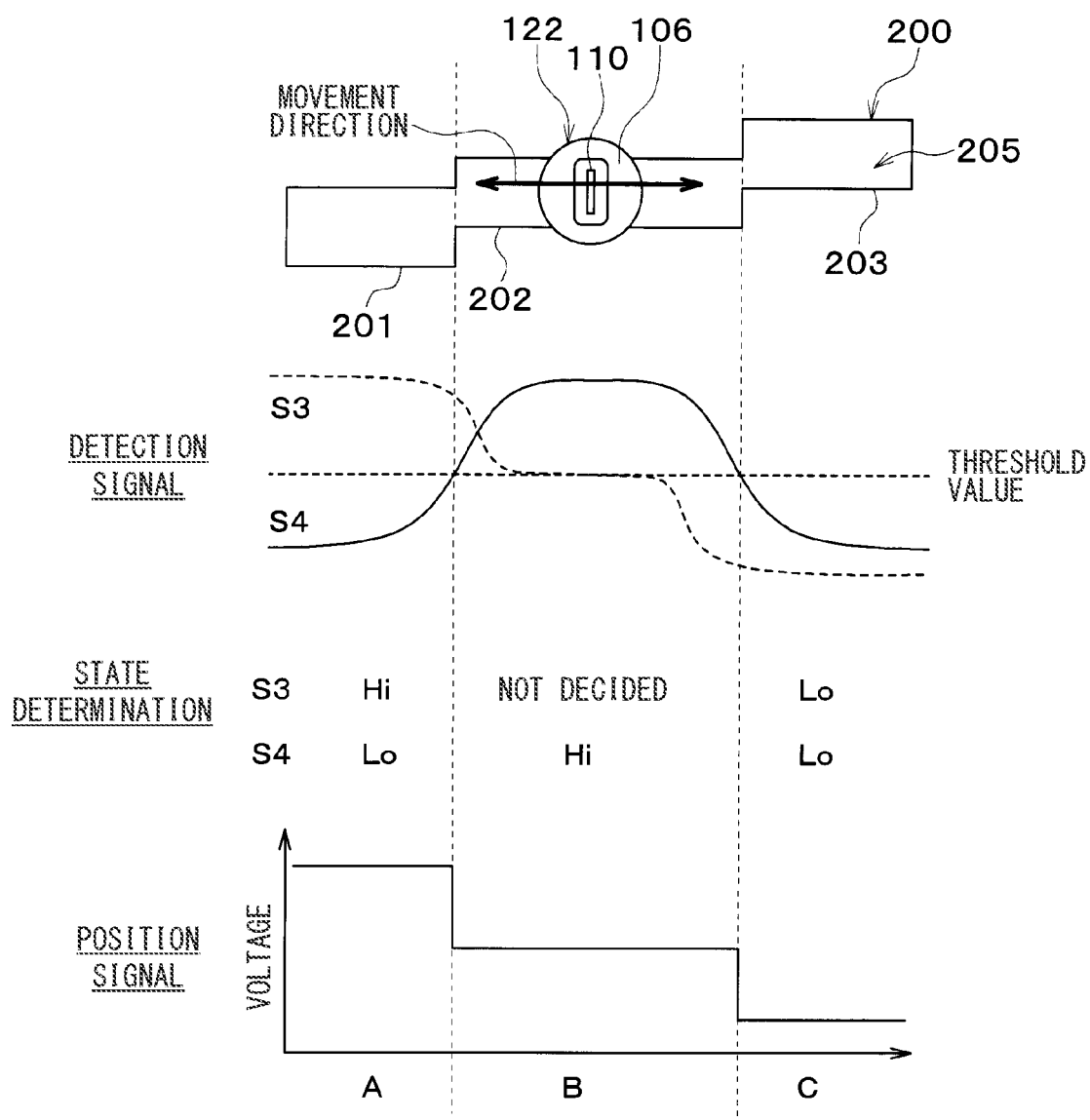
FIG. 13 illustrates a modified example for determining three states.

As illustrated in FIG. 13, the detector 200 may include three region parts 201 to 203 in a modified example. The processing unit 123 determines a case where the signal S3 is Hi and the signal S4 is Lo as "state A". The processing unit 123 determines a case where the signal S4 is Hi as "state B". The processing unit 123 determines a case where the signal S3 is Lo and the signal S4 is Lo as "state C". In this case, three discrete voltage values are respectively set in these three states as illustrated in FIG. 13.

Figure 14:
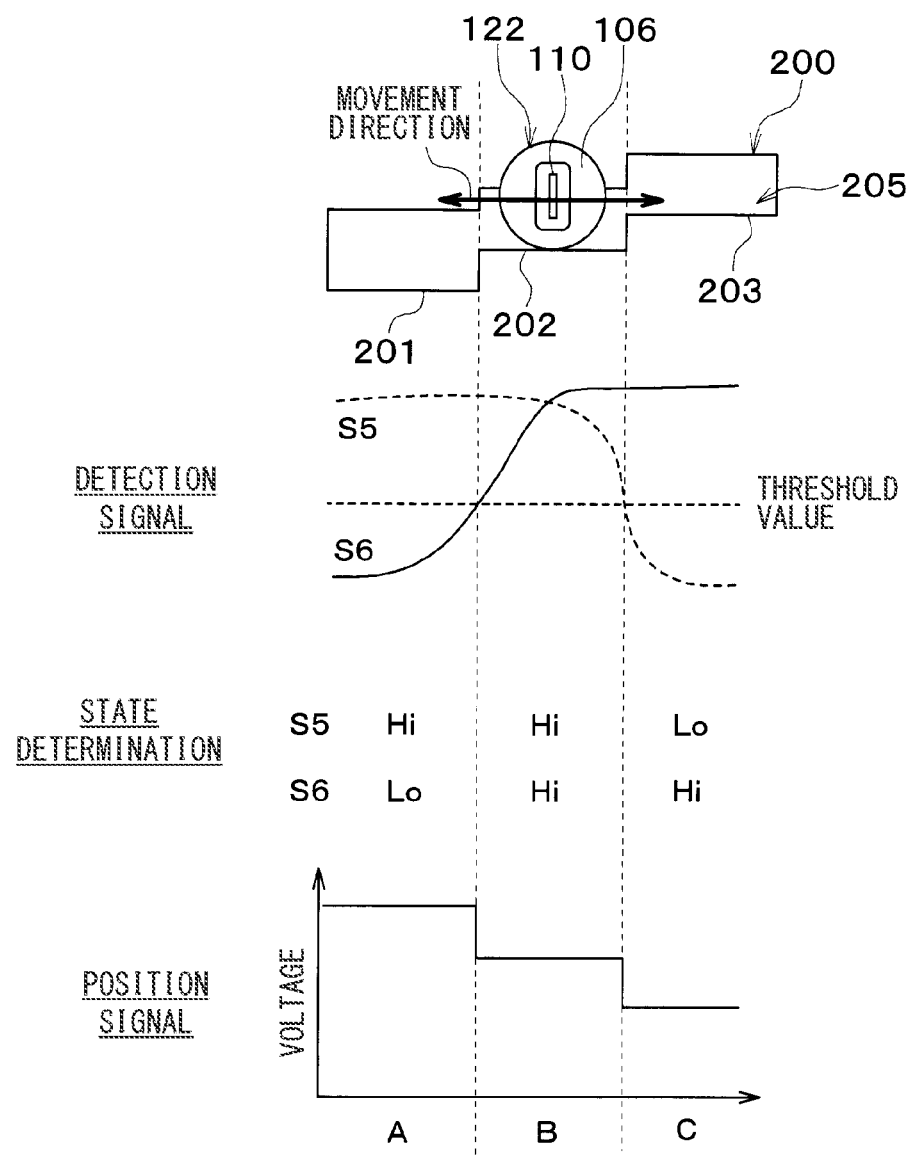
FIG. 14 illustrates a modified example for determining three states.

As illustrated in FIG. 14, signals S5, S6 having a phase difference distinct from the signals S3, S4 illustrated in FIG. 13 may be generated in a modified example. The signals S5, S6 can be generated by changing an arithmetic expression used for an output of each magnetic resistance element pair. The central region part 202 may be formed shorter than the region part 202, which is illustrated in FIG. 13, in the movement direction.

The number of detectable states can be changed freely by properly changing the number of region parts 201 to 204 or plural detection signals with a distinct phase difference. The present disclosure is not limited to the detection of three or four states. The detection of other number of states such as five or seven is possible.

Figure 15:
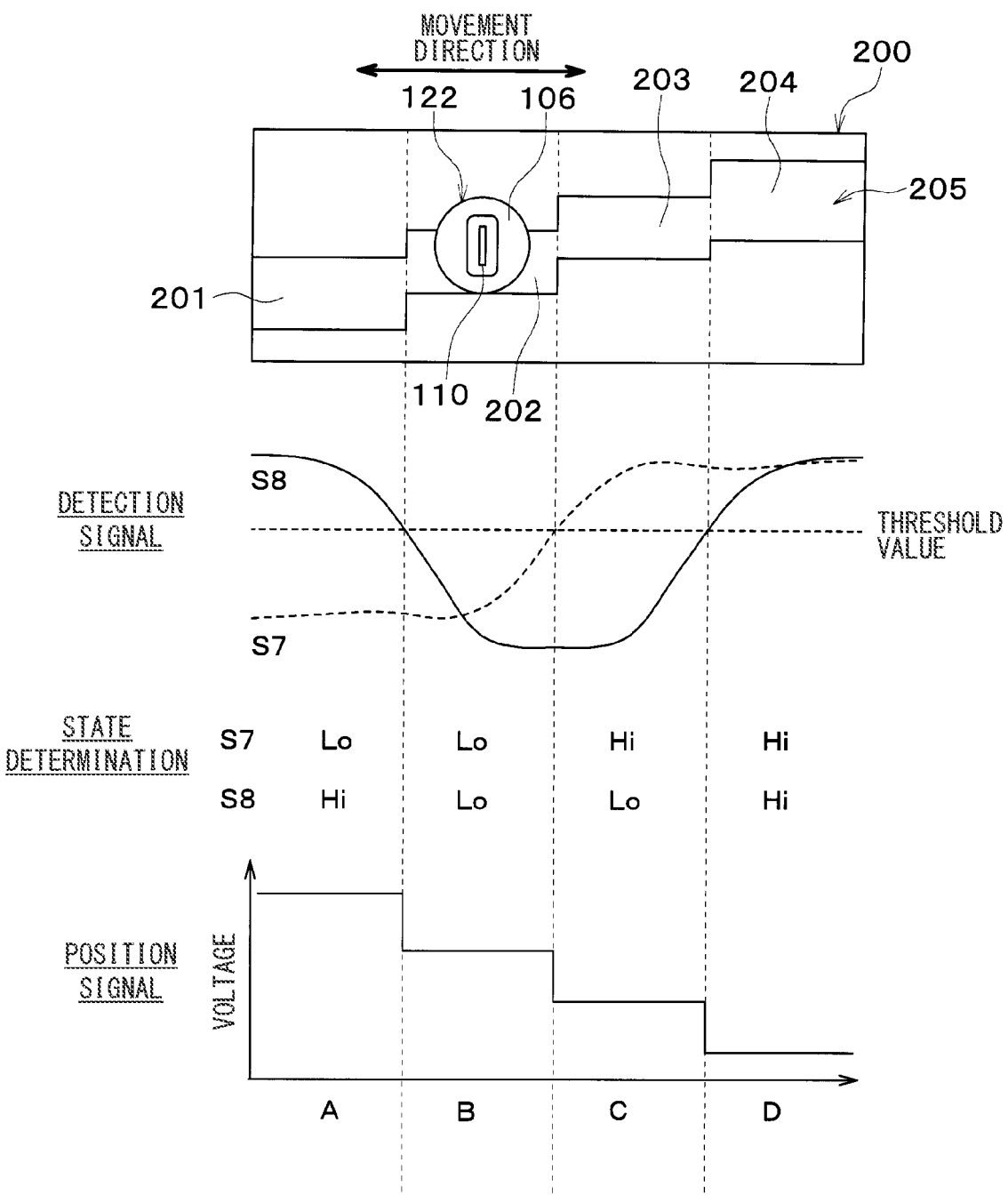
FIG. 15 illustrates a modified example for determining four states of a detection target, which has region parts respectively configured as space parts.

As illustrated in FIG. 15, the region parts 201 to 204 of the detection 200 may also be configured as space portions obtained by punching out a portion of a plate member in a modified example. In this case, the signals S7, S8 with a phase difference are obtained by inverting the signals S1, S2 illustrated in FIG. 11.

The signal processor 123 determines: a case where the signal S7 is Lo and the signal S8 is Hi as "state A"; a case where the signals S7 and S8 are Lo as "state B"; a case where the signal S7 is Hi and the signal S8 is Lo as "state C"; and a case where the signal S1 and S2 are Hi as "state D". The position detected by the detector 122 may be a space portion formed in a window of the detection target 200, instead of a material portion of the detection target 200.

Figure 16:
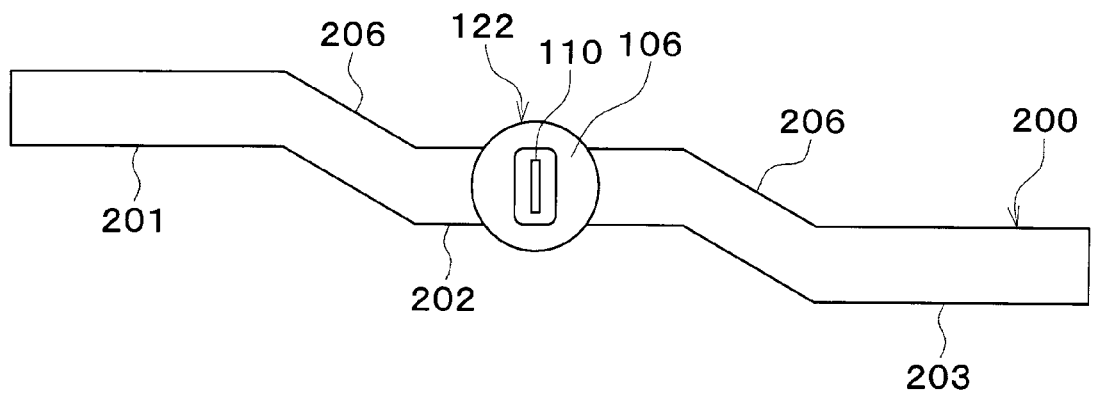
FIG. 16 illustrates a modified example in which a transition portion is provided between a region part and an adjacent region part.

As illustrated in FIG. 16, a transition portion 206 may be provided between the region parts 201 and 202, and between the region parts 202 and 203 in a modified example. Regardless of the number of region parts 201 to 204, the transition portion 206 may be provided between the adjacent region parts. The shape of the transition portion 206 is not limited to a linear shape or an R shape. The transition portion 206 may also be applied in a case where the region parts 201 to 204 are configured as space portions.

Figure 17:
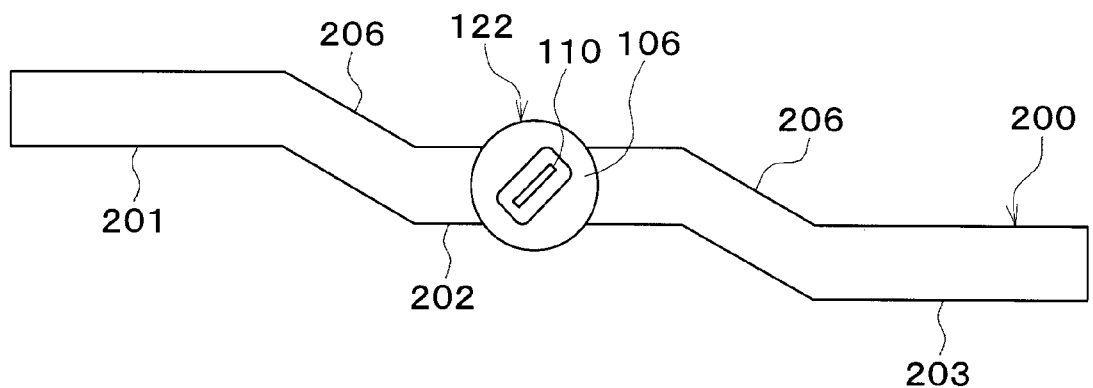
FIG. 17 illustrates a modified example in which a chip surface of a sensor chip is tilted with respect to a movement direction of a detection target.

As illustrated in FIG. 17, the chip surface of the sensor chip 110 where the detection element is provided may be tilted to the movement direction of the detector 122, instead of being in a direction perpendicular to the movement direction of the detector 122. FIG. 17 illustrates the transition portion 206 is provided at the detection target 200. However, the transition portion 206 may not be provided at the detection target 200.

Figure 18:
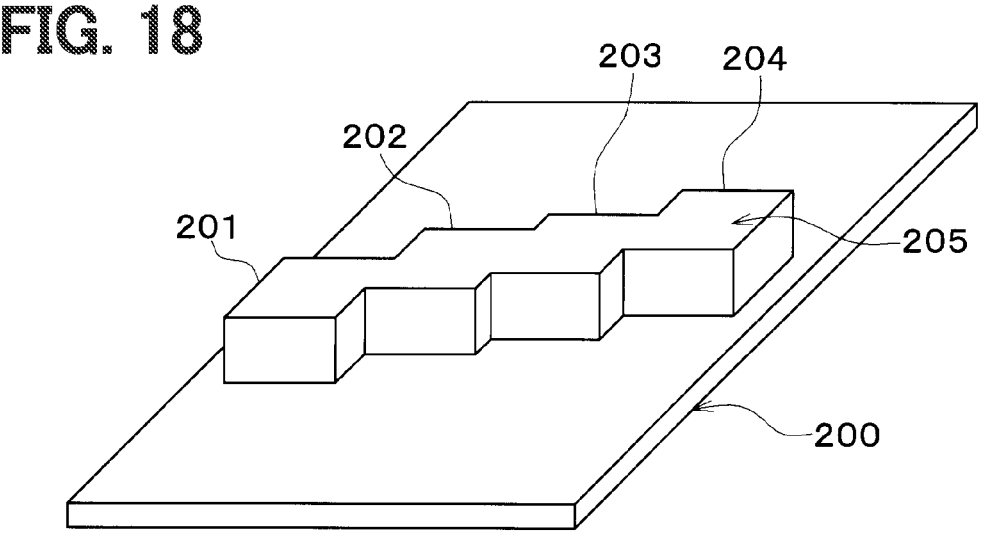
FIG. 18 illustrates a modified example in which a detection target has an uneven shape.

As illustrated in FIG. 18, the region parts 201 to 204 may have an uneven shape provided with a block at a plate member in a modified example.

Figure 19:
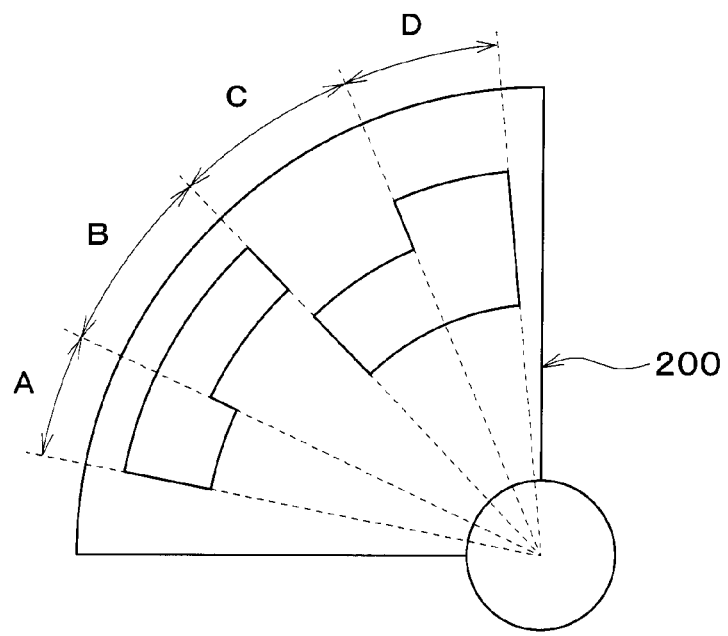
FIG. 19 illustrates a modified example in which a detection target has a circular sector.
Figure 20:
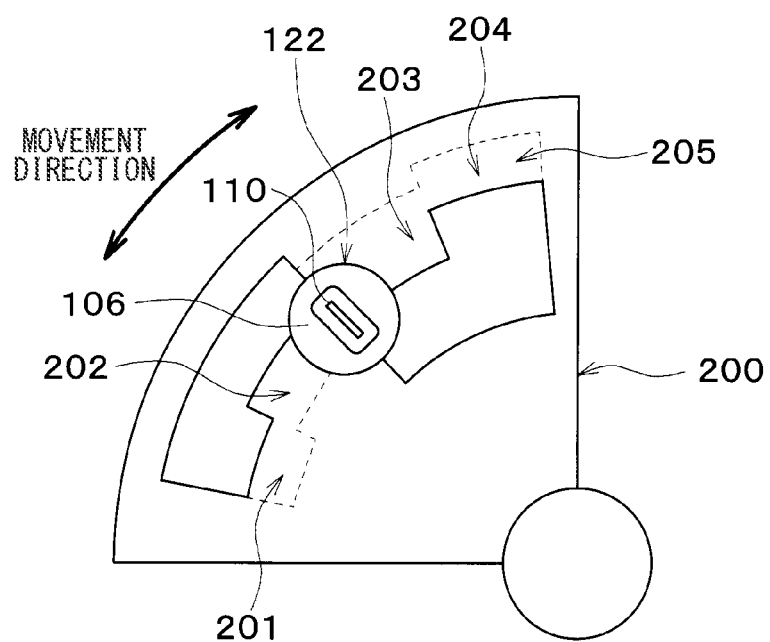
FIG. 20 illustrates a modified example in which a detection target has a circular sector.

As illustrated in FIGS. 19 and 20, in the detection target, a portion of a plate member having a circular sector may be punched out. In consideration of the punching shape, the region parts 201 to 204 in a stepwise manner illustrated in FIG. 10 may be provided in a circumferential direction of the circular sector. Thus, the position of each of the ranges A to D can be detected by rotating the detection target 200 around the axis.

Figure 21:
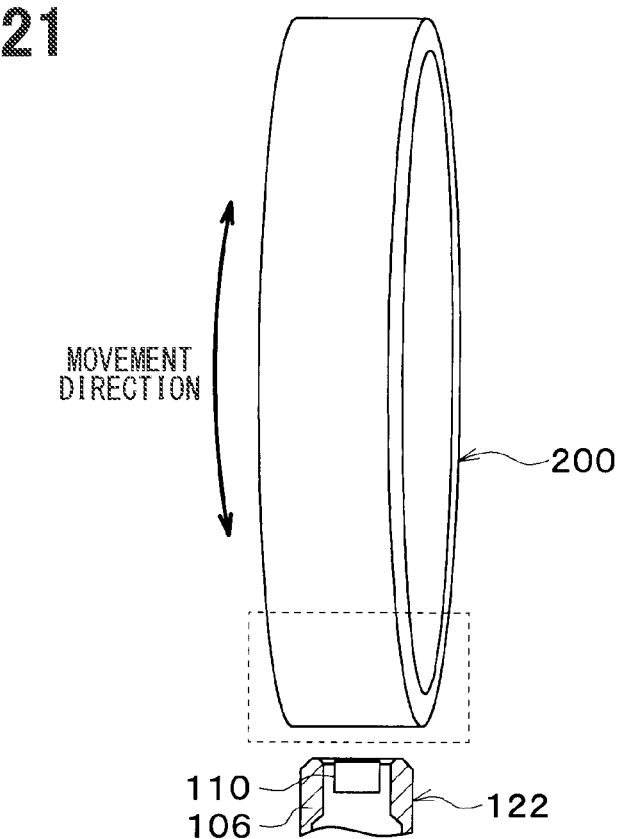
FIG. 21 illustrates a modified example in which a detection target has a rotatable body.
Figure 22:
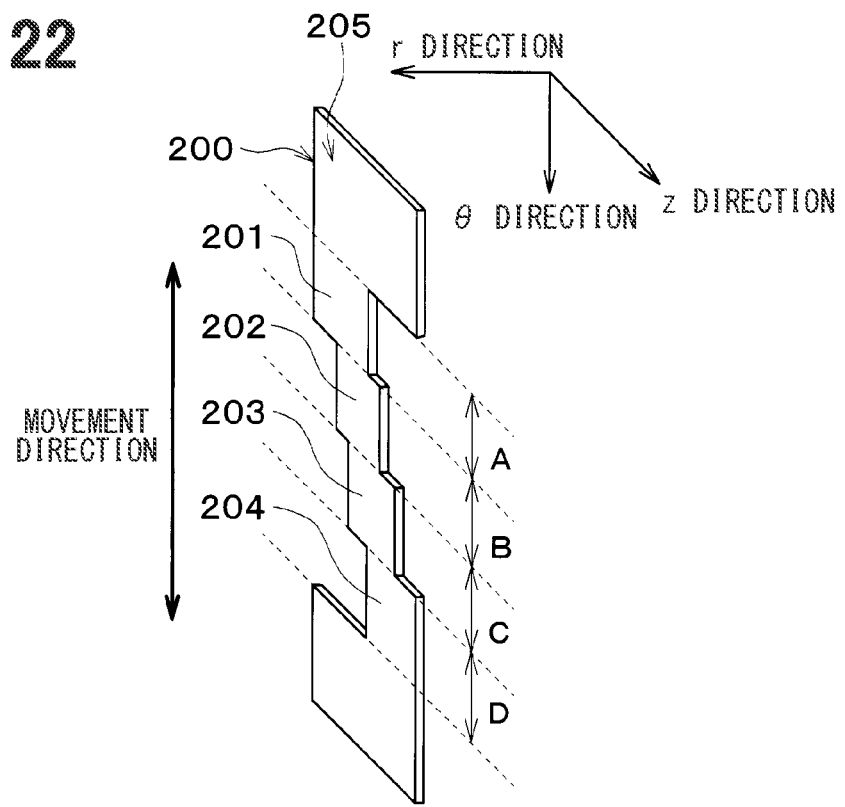
FIG. 22 illustrates that each region part is provided at the rotatable body in FIG. 21.

As illustrated in FIG. 21, the detection target 200 may include a rotatable body such as a rotor. The region parts 201 to 204, which correspond to a detection range, are provided in a broken-line portion illustrated in FIG. 21. In particular, as illustrated in FIG. 22, four region parts 201 to 204 are provided in a θ direction of the rotation angle. It is possible to determine the rotation state of the detection target 200 through the detector 122.

The controller 300 according to the present embodiment corresponds to an external device.

Second Embodiment

In the present embodiment, configurations different from those of the first embodiment will be described. In the present embodiment, the output circuit unit 126 outputs pulse signals with different pulse widths to the controller 300 as signals with discrete values. The discrete value signal is a PWM signal. The discrete value is a pulse width value, a signal period, a Duty ratio, or the like. It is possible to improve noise resistance as in the first embodiment.

Figure 23:
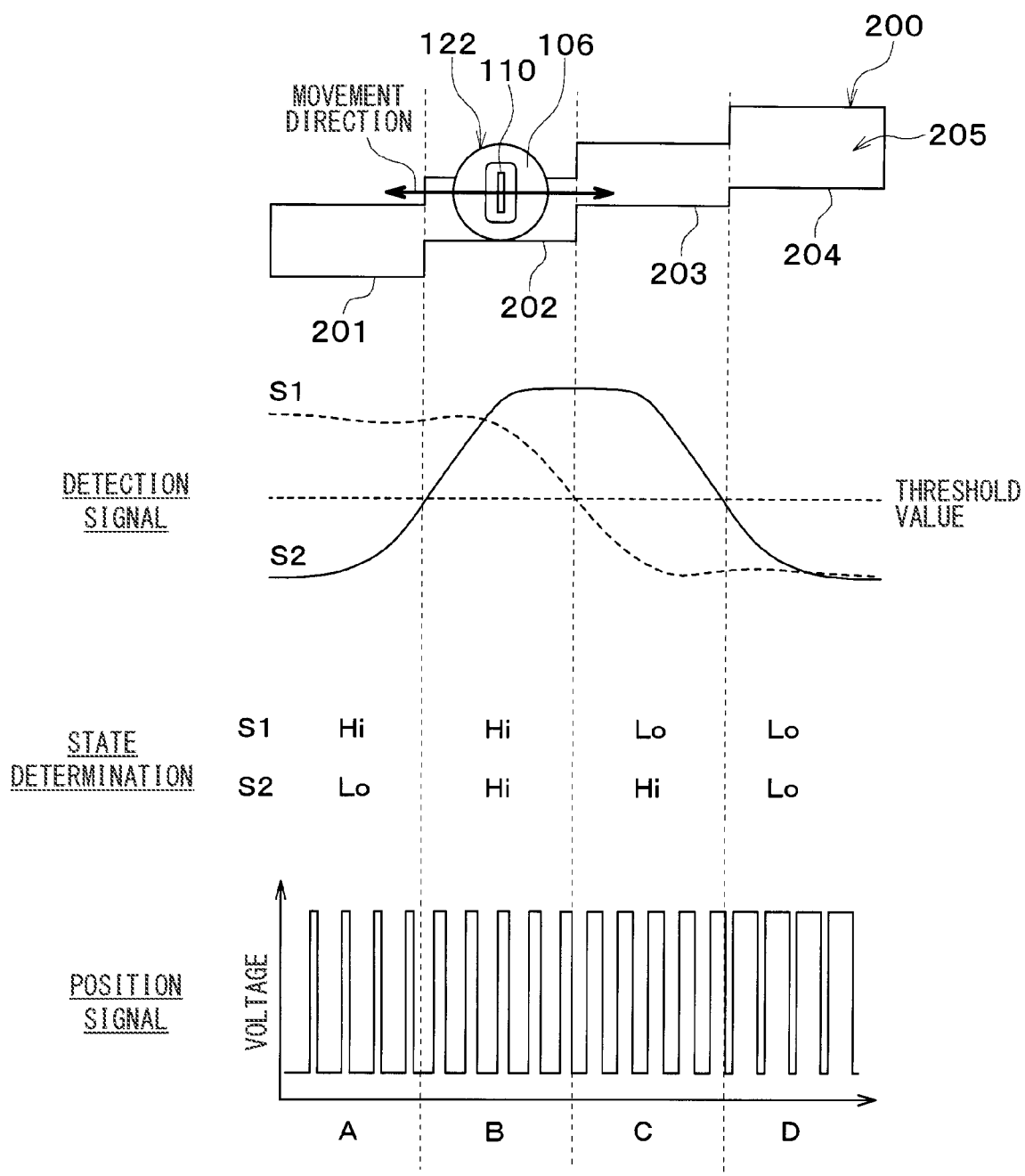
FIG. 23 illustrates discrete pulse widths for determining four states in a second embodiment.

As illustrated in FIG. 23, the pulse width of a signal in the state A is set to be the narrowest and the pulse width of a signal in the state D is set to be the widest. The pulse width of a signal in the states B, C is set to be intermediate between the pulse width of a signal in the state A and the pulse width of a signal in the state D. The pulse width may change in a stepwise manner from state A to state B, or may change randomly.

Third Embodiment

In the present embodiment, configurations different from those of the first and second embodiments are described. In the present embodiment, the entire detection target 200 or a portion of the detection target 200 is configured by a magnet, and the position sensor 200 is not provided with magnets 106, 120.

Figure 24:
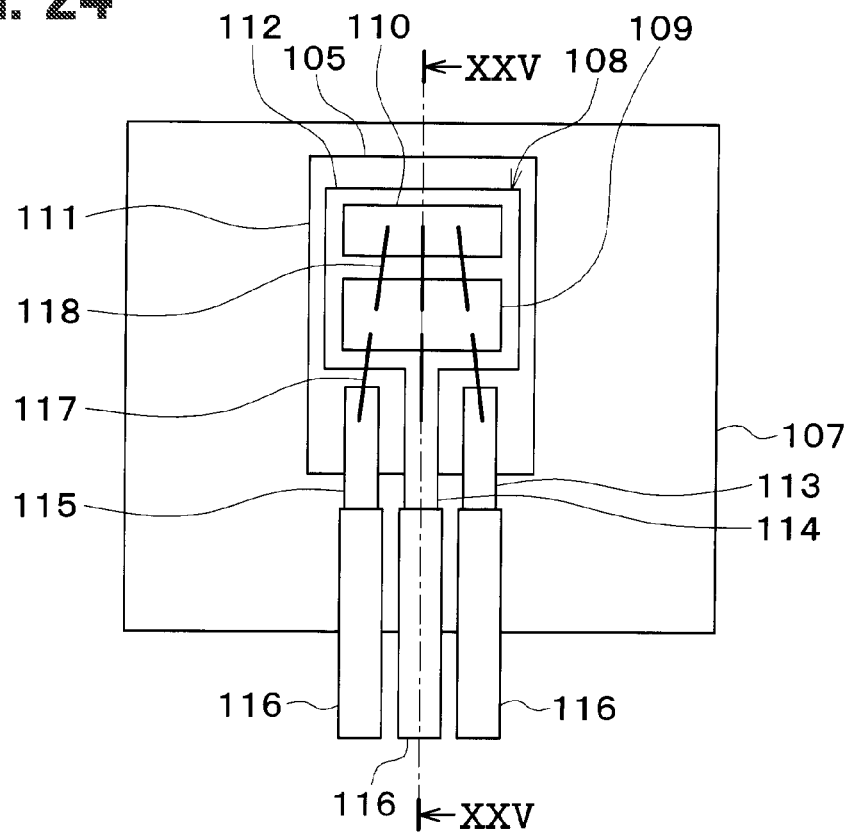
FIG. 24 is a plan view of components included in a magnetic detection system using a magnetic resistance element according to a third embodiment.
Figure 25:
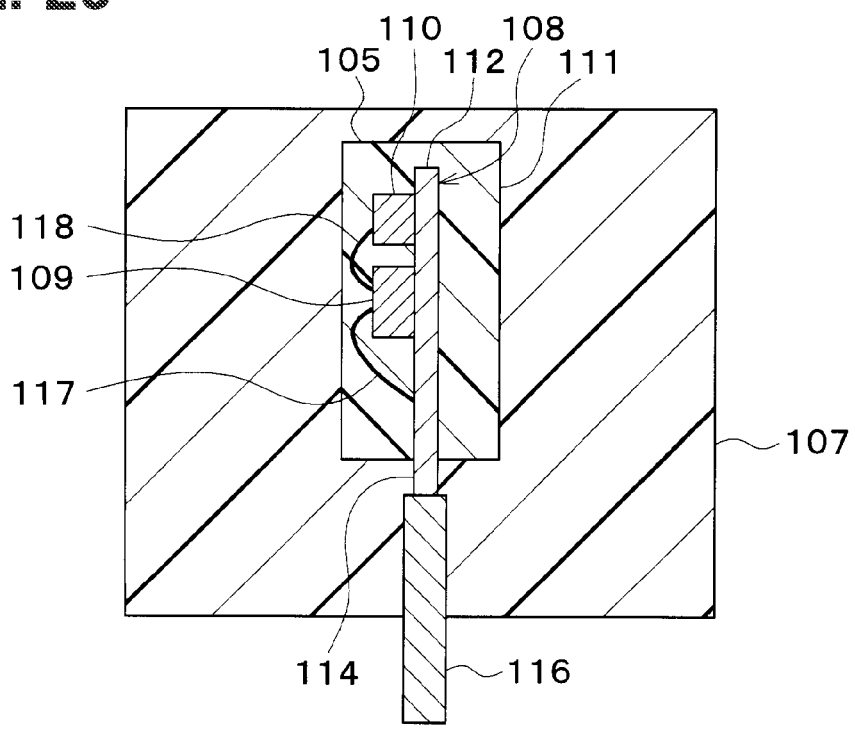
FIG. 25 is a cross-sectional view taken along a line XXV-XXV of FIG. 24.
Figure 26:
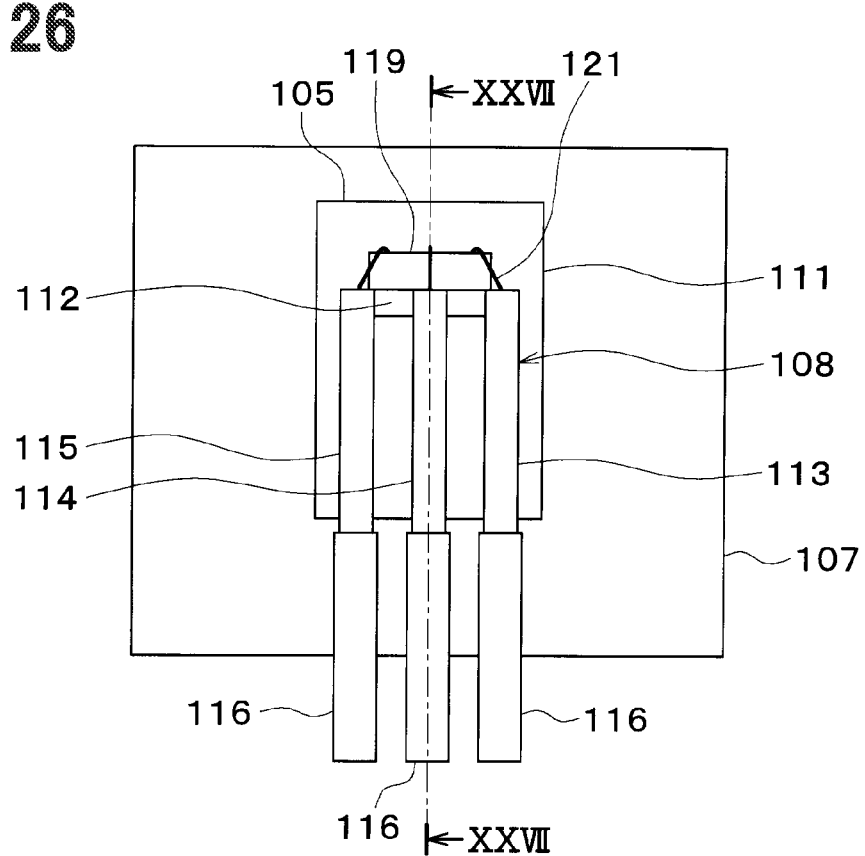
FIG. 26 is a plan view of components included in a magnetic detection system using a Hall-effect sensor according to the third embodiment.
Figure 27:
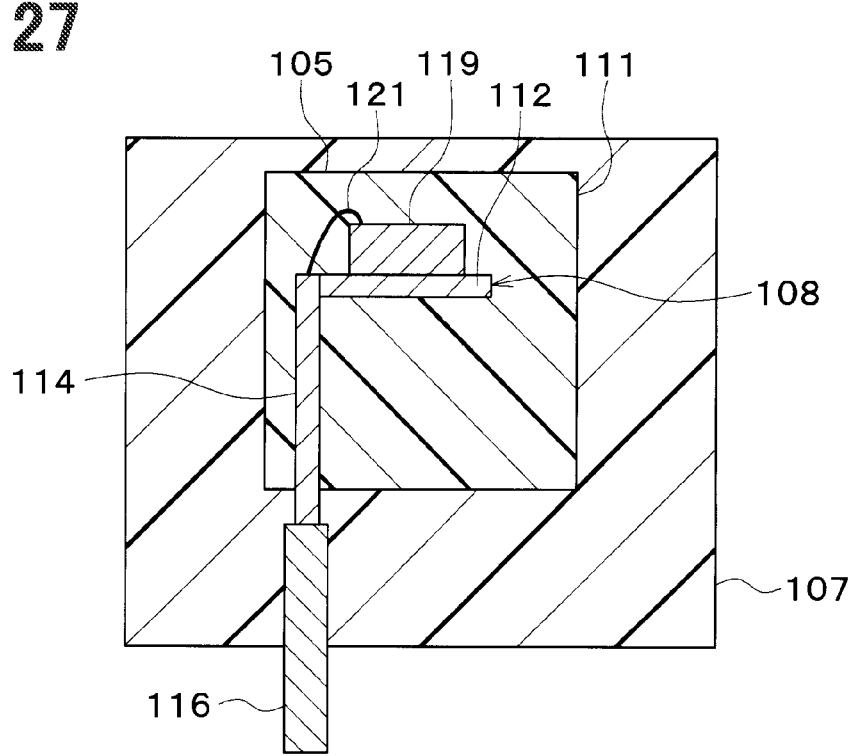
FIG. 27 is a sectional view taken along the line XXVII-XXVII of FIG. 26.

As illustrated FIGS. 24 and 25, the magnet 106 is not provided in the magnetic detection system using the magnet resistance element. Similarly, as illustrated in FIGS. 26 and 27, the magnet 120 is not provided in the magnetic detection system using the Hall-effect sensor. The mold IC 105 is directly inserted into the holder 107 and fixed at the holder 107.

Figure 28:
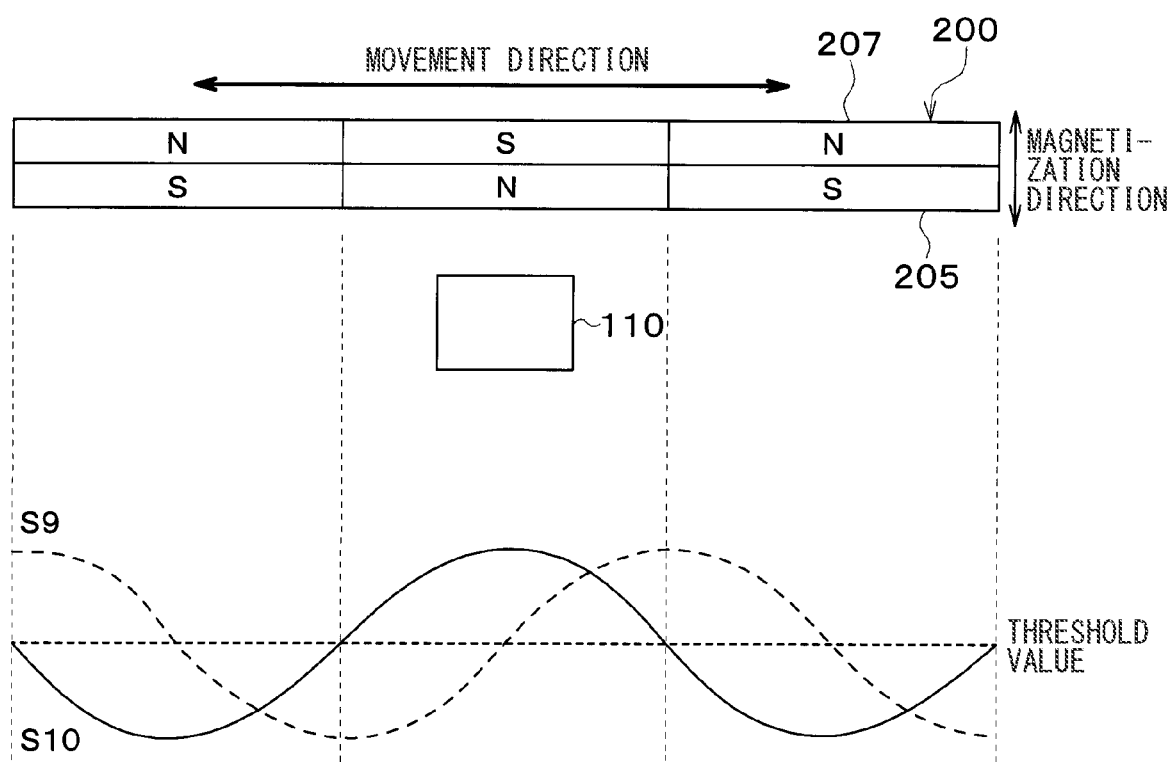
FIG. 28 illustrates a detection signal when the detection target is a magnet.

As illustrated in FIG. 28, the detection target 200 is configured as a magnet 207 having a magnetization direction on the sensor chip 110 side with respect to the movement direction. The detector 122 provided at the sensor chip 110 outputs a signal S9, which is maximum or minimum at the center of a magnetic pole, and a signal S10, which is maximum or minimum at the boundary of each magnetic pole, to the signal processor 123. The signals S9 and S10 are detection signals. Even if the detection target 200 is configured by the magnet 207, the signals S9, S10 have phase difference.

The N-pole/S-pole of the magnet 207 illustrated in FIG. 28 may be arranged reversely. The detector 122 may be configured such that the signal S9 is maximum or minimum at the boundary of each magnetic pole, and the number of magnetic poles included in one region part 201 to 204 is not limited to three. The number of magnetic poles may be other numbers.

Figure 29:
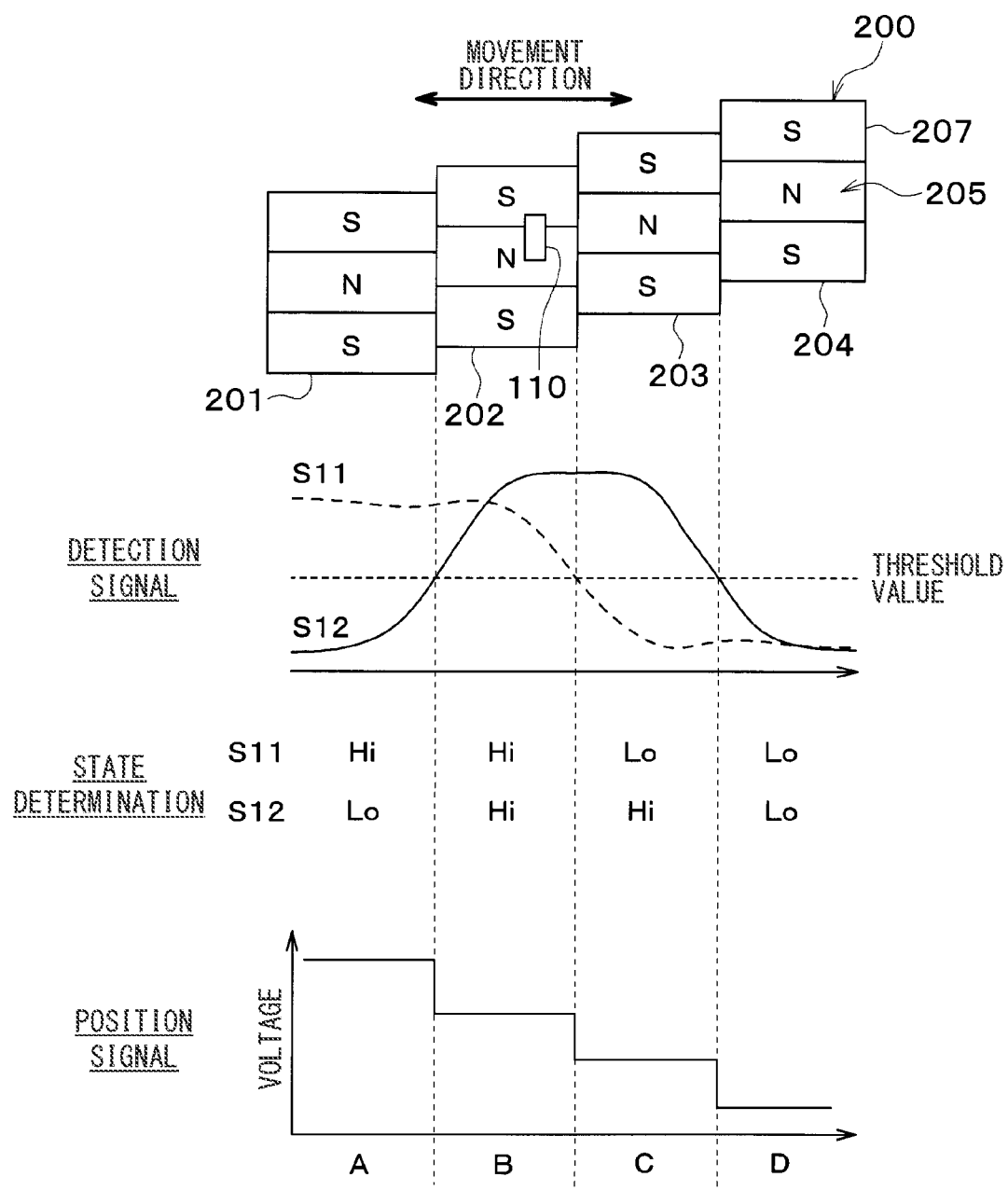
FIG. 29 illustrates a detection signal, state determination, and a position signal for detecting four states of the magnet.

As illustrated in FIG. 29, the region parts 201 to 204 of the detection target 200 is configured such that the N-pole of the magnet 207 is sandwiched between two S-poles. The magnetization direction of the magnet 207 is in a direction perpendicular to the drawing surface. The state determination is similar to the situation illustrated in FIG. 11 according to the first embodiment.

Figure 30:
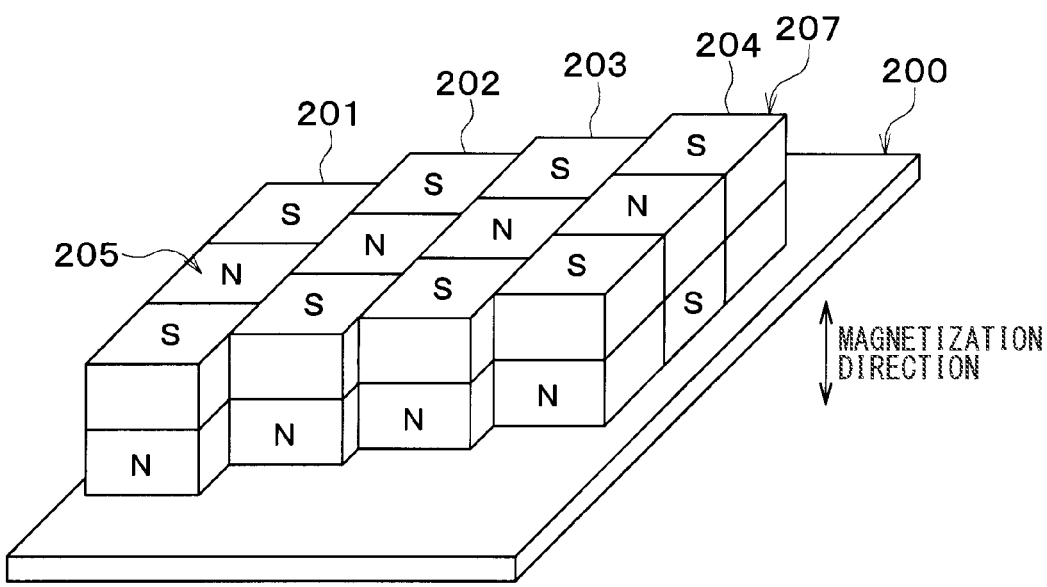
FIG. 30 illustrates a modified example of a detection target in which a magnet is attached to a plate member.

As illustrated in FIG. 30, the detection target 200 may be configured such that the magnet 207 having the region parts 201 to 204 is attached on a plate member in a modified example. The magnetization direction is a direction perpendicular to the plate surface of the plate member.

Figure 31:
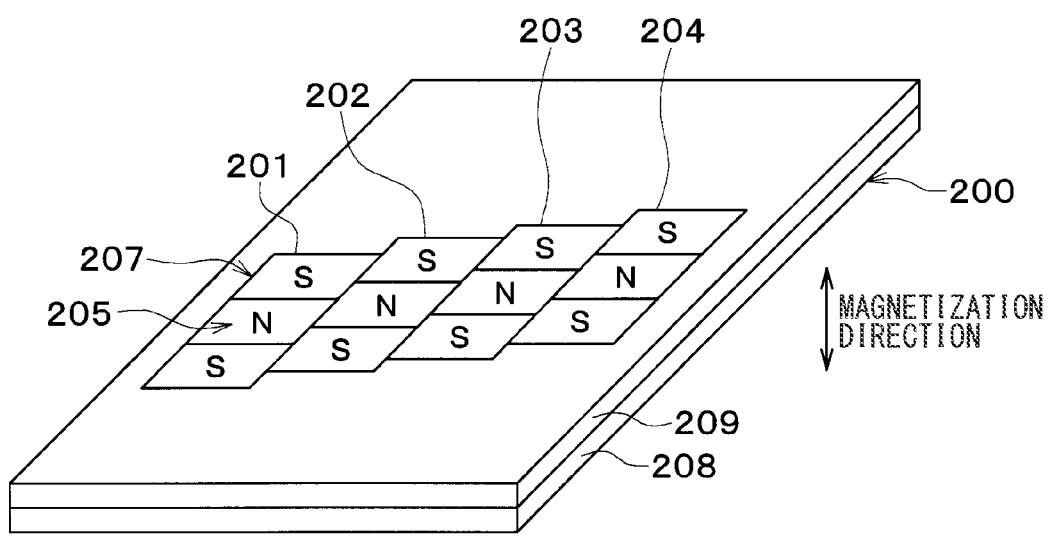
FIG. 31 illustrates a modified example in which a detection target including a plate member and a rubber magnet is magnetized.

As illustrated in FIG. 31, the detection target 200 may be magnetized such that a part of a rubber magnet 209 provided on a magnetic plate member 208 becomes the magnet 207 in a modified example. The magnetization direction is a direction perpendicular to the plate surface of the rubber magnet 209.

Figure 32:
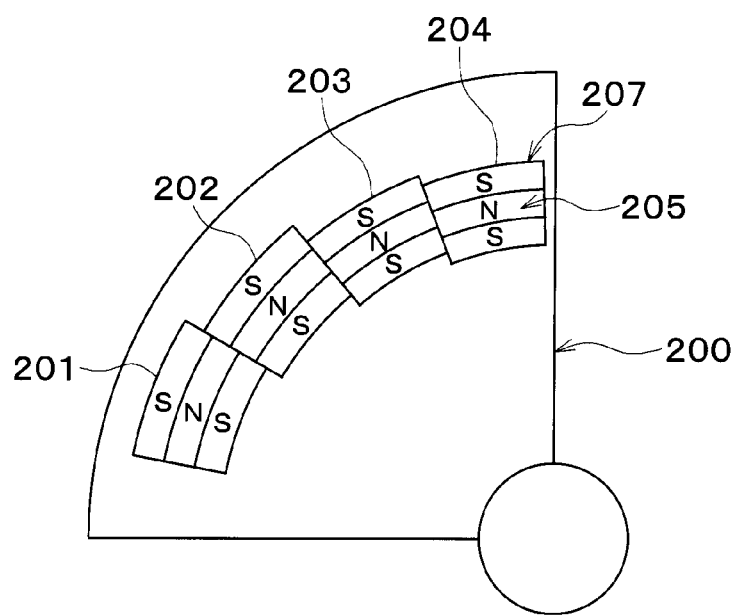
FIG. 32 illustrates a modified example in which a magnet is provided at a detection target having a circular sector.

As shown in FIG. 32, the detection target 200 may be configured such that the magnet 207 is attached to the plate member having a circular sector in a modified example.

Figure 33:
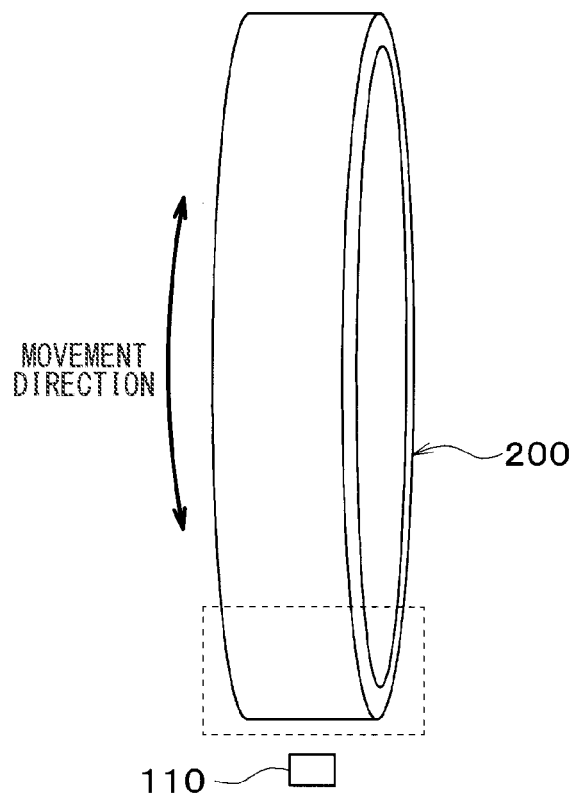
FIG. 33 illustrates a modified example in which a magnet is provided at a detection target having a rotatable body.
Figure 34:
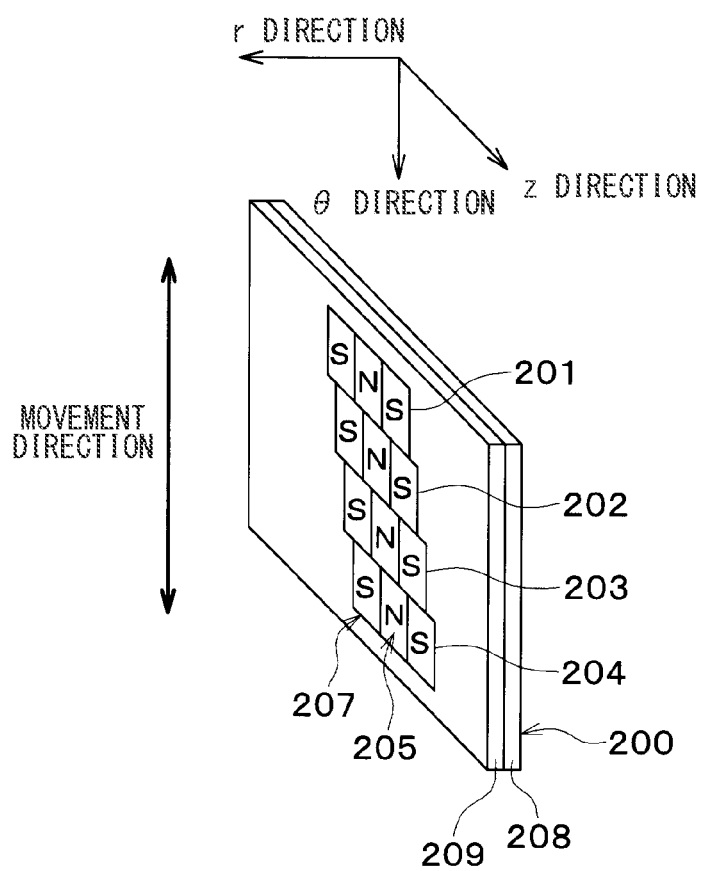
FIG. 34 illustrates each region part provided at the rotatable body in FIG. 33.

As illustrated in FIG. 33, the detection target 200 may be configured such that the magnet 207 is provided at a rotatable body such as a rotor in a modified example. In this case, as illustrated in FIG. 34, the magnet 207 included in four region parts 201 to 204 in the θ direction of the rotation angle is provided in a broken-line portion of FIG. 33. The magnet 207 may be similar to the configuration illustrated in FIG. 31, or may be configured such that the magnet 207 is attached to the plate member.

Other Embodiments

Although the present disclosure has been described in accordance with the examples, it is understood that the present disclosure is not limited to such examples or structures. The present disclosure encompasses various modifications and variations within the scope of equivalents. In addition, while the various elements are shown in various combinations and configurations, which are exemplary, other combinations and configurations, including more, less or only a single element, are also within the spirit and scope of the present disclosure. For example, the position sensor 100 is used not only for vehicles but also for industrial robots and manufacturing facilities as a sensor detecting the positions of movable components.

The above describes a configuration, in which the detection target 200 does not include the magnet 207 and the position sensors 100 includes the magnets 106, 120, and a configuration, in which the detection target 200 includes the magnet 207 and the position sensor 100 does not include the magnets 106, 120. However, a combination thereof is an example. The magnet 207 may be included in the detection target 200, and the magnets 106, 120 may be included in the position sensor 100. In this case, the operation of the position sensor 100 is similar to the first embodiment.

What is claimed is:

1. A position sensor, comprising:
a detector, which includes a magnet generating a bias magnetic field and a detection element applied by the bias magnetic field, the detector which is configured to generate a plurality of detection signals including distinct phase difference and corresponding to a plurality of ranges aligned in one direction along a movement direction of a detection target having a magnetic body, based on a change in a magnetic field received by the detection element from the detection target with a movement of the detection target; and
a signal processor that is configured to
acquire the detection signals from the detector,
compare the detection signals with a threshold value, and
specify a position of the detection target as a position at one of the ranges based on a combination of magnitude relation between the detection signals and the threshold value,
wherein the detection target includes a plurality of region parts corresponding to the respective ranges,
wherein the region parts are connected in a stepwise manner in the movement direction of the detection target, on a detection surface of the detection target,
wherein the detection surface faces the detector,
wherein the detector has a width in the movement direction of the detection target, and
wherein the width of the detector is shorter than a width of a smallest region part among the region parts.

2. The position sensor according to claim 1,
wherein each of the region parts is a rectangular plate member.

3. The position sensor according to claim 1,
wherein an end portion of the detection surface, which faces the detector, is in a stepwise manner.

4. The position sensor according to claim 1,
wherein the detection element includes a plurality of magnetic resistance element pairs, each of which having a resistance value varied with the movement of the detection target.

5. The position sensor according to claim 4,
wherein the detection element generates the detection signals based on output of the magnetic resistance element pairs.

6. The position sensor according to claim 1,
wherein the signal processor is configured to respectively set discrete values to the ranges, and
wherein the signal processor is configured to output a position signal, which indicates one of the discrete values corresponding to the one of the ranges covering the position of the detection target specified by the signal processor, to an external device.

7. The position sensor according to claim 6,
wherein the position signal being one of the discrete values is a voltage signal having a distinct voltage value.

8. The position sensor according to claim 6,
wherein the position signal being one of the discrete values is a pulse signal having a distinct pulse width.

9. The position sensor according to claim 1,
wherein the ranges are a plurality of detectable regions aligned in one direction in a series manner along the movement direction of the detection target.

10. The position sensor according to claim 1,
wherein the detection target is a moveable component moving in conjunction with an operation of a shift position of a vehicle.

11. A position sensor, comprising:
a detector that is configured to generate a plurality of detection signals including distinct phase difference and corresponding to a plurality of ranges aligned in one direction along a movement direction of a detection target having a magnet, based on a change in a magnetic field received by the detection element from the detection target with a movement of the detection target; and
a signal processor that is configured to
acquire the detection signals from the detector,
compare the detection signals with a threshold value, and
specify a position of the detection target as a position at one of the ranges based on a combination of magnitude relation between the detection signals and the threshold value,
wherein the detection target includes a plurality of region parts corresponding to the respective ranges,
wherein the region parts are connected in a stepwise manner in the movement direction of the detection target, on a detection surface of the detection target, and
wherein the detection surface faces the detector,
wherein the detector has a width in the movement direction of the detection target, and
wherein the width of the detector is shorter than a width of a smallest region part among the region parts.

12. The position sensor according to claim 11,
wherein the detection target is the magnet having a magnetization direction to the detector.

* * * * *